(12) United States Patent
Holmes et al.

(10) Patent No.: US 11,595,595 B2
(45) Date of Patent: Feb. 28, 2023

(54) VERIFICATION SYSTEM FOR A PHARMACY PACKAGING SYSTEM

(71) Applicant: RXSAFE LLC, Vista, CA (US)

(72) Inventors: William K. Holmes, San Diego, CA (US); Aaron Arsenault, San Diego, CA (US)

(73) Assignee: RXSAFE LLC, Vista, CA (US)

( * ) Notice: Subject to any disclaimer, the term of this patent is extended or adjusted under 35 U.S.C. 154(b) by 0 days.

(21) Appl. No.: 16/999,327

(22) Filed: Aug. 21, 2020

(65) Prior Publication Data
US 2020/0404196 A1 Dec. 24, 2020

Related U.S. Application Data

(63) Continuation-in-part of application No. 16/821,823, filed on Mar. 17, 2020, now Pat. No. 11,039,091,
(Continued)

(51) Int. Cl.
*H04N 5/33* (2006.01)
*G06V 10/143* (2022.01)
(Continued)

(52) U.S. Cl.
CPC .............. *H04N 5/332* (2013.01); *A61J 1/03* (2013.01); *B65B 1/04* (2013.01); *B65B 41/12* (2013.01);
(Continued)

(58) Field of Classification Search
CPC .......... H04N 5/332; B65B 41/12; B65B 1/04; G06K 9/00624; G06K 9/2018;
(Continued)

(56) References Cited

U.S. PATENT DOCUMENTS 3,709,598 A 1/1973 Vandenberg et al.
4,546,901 A 10/1985 Buttarazzi
(Continued)

FOREIGN PATENT DOCUMENTS

EP 2591761 A1 5/2013
WO 1999017218 A1 4/1999
(Continued)

OTHER PUBLICATIONS

J. J. Caban, A. Rosebrock and T. S. Yoo, "Automatic identification of prescription drugs using shape distribution models," 2012 19th IEEE International Conference on Image Processing, 2012, pp. 1005-1008, doi: 10.1109/ICIP.2012.6467032. (Year: 2012).*
(Continued)

*Primary Examiner* — Michael Robert Cammarata
(74) *Attorney, Agent, or Firm* — Michael Best & Friedrich LLP

(57) ABSTRACT

A method and verification system for verifying pharmaceuticals packaged within a pouch using a pharmacy packaging system. The method includes activating a first light source to illuminate the pharmaceutical pouch, capturing a first image of the pharmaceutical pouch while illuminated by the first light source, activating a second light source to illuminate the pharmaceutical pouch, and capturing a second image of the pharmaceutical pouch while illuminated by the second light source. The method further includes generating a third image based on the first image and the second image, generating a dashboard to simultaneously display first images, second images, and third images from a plurality of pharmaceutical pouches, providing a number of pills indication of a number of pills detected in the pouch against a number of pills expected in the pouch, and displaying the dashboard.

20 Claims, 16 Drawing Sheets

Related U.S. Application Data which is a continuation of application No. 16/216,184, filed on Dec. 11, 2018, now Pat. No. 10,594,956, which is a continuation of application No. 15/277,493, filed on Sep. 27, 2016, now Pat. No. 10,187,593.

(51) Int. Cl.

| | |
|---|---|
| *A61J 1/03* | (2006.01) |
| *B65B 41/12* | (2006.01) |
| *H04N 5/225* | (2006.01) |
| *H04N 5/232* | (2006.01) |
| *B65B 1/04* | (2006.01) |
| *G06V 20/00* | (2022.01) |

(52) U.S. Cl.
CPC ............ *G06V 10/143* (2022.01); *G06V 20/00* (2022.01); *H04N 5/2256* (2013.01); *H04N 5/23229* (2013.01); *A61J 2205/00* (2013.01); *G06T 2207/30242* (2013.01)

(58) Field of Classification Search
CPC .......... G06T 2207/30242; G06V 20/00; G06V 10/143; A61J 1/03; A61J 2205/00
See application file for complete search history.

(56) References Cited

U.S. PATENT DOCUMENTS

| | | | |
|---|---|---|---|
| 4,679,068 A | 7/1987 | Lillquist et al. | |
| 4,751,571 A | 6/1988 | Lillquist | |
| 5,522,512 A | 6/1996 | Archer et al. | |
| 6,079,284 A | 6/2000 | Yamamoto et al. | |
| 6,108,030 A | 8/2000 | Yamamoto et al. | |
| 6,286,421 B1 | 9/2001 | Ackley | |
| 6,324,253 B1 | 11/2001 | Yuyama et al. | |
| 6,330,351 B1 | 12/2001 | Yasunaga | |
| 6,345,487 B1 | 2/2002 | Luciano et al. | |
| 6,434,911 B1 | 8/2002 | Yamamoto et al. | |
| 6,450,089 B2 | 9/2002 | Ackley | |
| 6,481,347 B2 | 11/2002 | Ackley | |
| 6,505,461 B1 | 1/2003 | Yasunaga | |
| 6,535,637 B1 | 3/2003 | Wootton et al. | |
| 6,739,455 B2 | 5/2004 | Yamamoto et al. | |
| 6,741,731 B1 | 5/2004 | Yamamoto et al. | |
| 6,805,245 B2 | 10/2004 | Kenneway | |
| 7,079,236 B2 | 7/2006 | Yamamoto et al. | |
| 7,102,741 B2 | 9/2006 | Ackley, Jr. et al. | |
| 7,701,568 B2 | 4/2010 | Ackley, Jr. et al. | |
| 7,706,596 B2 | 4/2010 | Garvey | |
| 7,769,221 B1 * | 8/2010 | Shakes | B07C 3/20 382/141 |
| 7,782,365 B2 | 8/2010 | Levien et al. | |
| 7,794,394 B2 | 9/2010 | Frangioni | |
| 7,994,480 B2 * | 8/2011 | Johnson | G01C 3/08 250/370.08 |
| 7,995,831 B2 | 8/2011 | Eller et al. | |
| 8,037,992 B2 | 10/2011 | Ackley, Jr. et al. | |
| 8,060,249 B2 | 11/2011 | Bear et al. | |
| 8,072,590 B2 | 12/2011 | Ackley, Jr. et al. | |
| 8,146,331 B2 | 4/2012 | Soloman | |
| 8,269,958 B2 | 9/2012 | Ackley, Jr. et al. | |
| 8,271,128 B1 * | 9/2012 | Schultz | A61J 7/02 700/242 |
| 8,295,582 B2 | 10/2012 | Eller et al. | |
| 8,300,922 B1 | 10/2012 | Garvey, III | |
| 8,340,392 B2 | 12/2012 | Kim | |
| 8,457,361 B2 | 6/2013 | Julius et al. | |
| 8,467,897 B2 | 6/2013 | Holmes et al. | |
| 8,538,581 B2 | 9/2013 | Kuehnrich et al. | |
| 8,571,297 B2 | 10/2013 | Eller et al. | |
| 8,582,863 B2 | 11/2013 | Van Den Brink | |
| 8,583,281 B2 | 11/2013 | Bear et al. | |
| 8,584,715 B2 | 11/2013 | Stoeckel et al. | |
| 8,646,591 B2 | 2/2014 | De Ruijter et al. | |
| 8,727,208 B2 | 5/2014 | Poisner | |
| 8,729,528 B2 | 5/2014 | Klem et al. | |
| 8,742,398 B2 | 6/2014 | Klem et al. | |
| 8,749,635 B2 | 6/2014 | Hogasten et al. | |
| 8,791,993 B2 | 7/2014 | Kim | |
| 8,943,779 B2 * | 2/2015 | Amano | H04N 7/18 53/52 |
| 8,959,878 B2 | 2/2015 | Okuma | |
| 8,964,054 B2 | 2/2015 | Jung et al. | |
| 8,966,863 B2 | 3/2015 | Amano et al. | |
| 9,008,408 B2 | 4/2015 | Sinbar et al. | |
| 9,041,826 B2 | 5/2015 | Jung et al. | |
| 9,098,900 B2 * | 8/2015 | Helgason | G06T 17/10 |
| 9,135,701 B2 | 9/2015 | Guissin et al. | |
| 9,184,204 B2 | 11/2015 | Hu | |
| 9,233,767 B2 | 1/2016 | Amano et al. | |
| 9,235,690 B2 | 1/2016 | Bear et al. | |
| 9,259,766 B2 | 2/2016 | Ackley et al. | |
| 9,272,796 B1 * | 3/2016 | Chudy | G07G 1/0045 |
| 9,311,451 B2 | 4/2016 | Bae et al. | |
| 9,334,096 B2 | 5/2016 | Luciano et al. | |
| 9,387,155 B2 | 7/2016 | Morioka et al. | |
| 9,406,127 B2 | 8/2016 | Helgason et al. | |
| 9,407,838 B2 | 8/2016 | Butte et al. | |
| 9,413,988 B2 | 8/2016 | Heinke et al. | |
| 9,468,948 B2 | 10/2016 | Ackley et al. | |
| 9,517,855 B2 | 12/2016 | Murokh | |
| 9,599,461 B2 | 3/2017 | Gerlach et al. | |
| 9,621,749 B2 | 4/2017 | Jung et al. | |
| 9,637,323 B2 | 5/2017 | Kim | |
| 9,716,843 B2 | 7/2017 | Fox et al. | |
| 9,730,649 B1 | 8/2017 | Jepsen | |
| 9,731,909 B2 | 8/2017 | Kim | |
| 9,741,761 B2 | 8/2017 | Jiang et al. | |
| 9,757,772 B2 | 9/2017 | Ackley et al. | |
| 9,766,114 B2 | 9/2017 | Ademe | |
| 9,776,755 B2 | 10/2017 | Kondo et al. | |
| 9,835,445 B2 | 12/2017 | Strandemar et al. | |
| 9,836,583 B2 | 12/2017 | Garcia et al. | |
| 9,843,743 B2 | 12/2017 | Lewis et al. | |
| 9,886,751 B2 | 2/2018 | Jacobs et al. | |
| 9,906,739 B2 | 2/2018 | Sugano et al. | |
| 9,912,913 B2 | 3/2018 | Johnson et al. | |
| 9,994,347 B2 * | 6/2018 | Yuyama | G16H 30/20 |
| 10,015,474 B2 | 7/2018 | Rhead et al. | |
| 10,187,593 B2 | 1/2019 | Holmes | |
| 10,594,956 B2 | 3/2020 | Holmes | |
| 11,039,091 B2 * | 6/2021 | Holmes | H04N 5/23229 |
| 11,289,179 B1 * | 3/2022 | Brown | G16H 20/10 |
| 2006/0015536 A1 * | 1/2006 | Buchanan | G16H 30/20 |
| 2006/0271237 A1 | 11/2006 | Kim | |
| 2007/0008326 A1 | 1/2007 | Levien et al. | |
| 2008/0056556 A1 | 3/2008 | Eller et al. | |
| 2008/0307757 A1 | 12/2008 | Heim et al. | |
| 2009/0055116 A1 | 2/2009 | Chen et al. | |
| 2010/0071320 A1 | 3/2010 | Mi et al. | |
| 2011/0137177 A1 | 6/2011 | Toma et al. | |
| 2011/0184751 A1 | 7/2011 | Holmes | |
| 2011/0188707 A1 | 8/2011 | Shutt | |
| 2012/0200596 A1 * | 8/2012 | Gotou | B07C 5/38 345/625 |
| 2013/0058550 A1 | 3/2013 | Tanimoto et al. | |
| 2013/0142406 A1 | 6/2013 | Lang et al. | |
| 2013/0170732 A1 | 7/2013 | Gotou et al. | |
| 2013/0176424 A1 | 7/2013 | Weil | |
| 2013/0188038 A1 | 7/2013 | Tanimoto et al. | |
| 2013/0218330 A1 * | 8/2013 | Chudy | G16H 20/10 700/244 |
| 2013/0307992 A1 | 11/2013 | Erlandsson et al. | |
| 2013/0318931 A1 * | 12/2013 | Holmes | G07F 11/1657 53/562 |
| 2013/0342676 A1 | 12/2013 | Amano et al. | |
| 2014/0033644 A1 * | 2/2014 | Amano | B65B 57/10 53/52 |
| 2014/0094960 A1 | 4/2014 | Holmes | |
| 2014/0236349 A1 * | 8/2014 | Bae | B65B 1/46 700/236 |
| 2014/0261881 A1 * | 9/2014 | Chudy | A61J 7/0084 141/94 |

(56) References Cited

U.S. PATENT DOCUMENTS

| | | |
|---|---|---|
| 2015/0077534 A1 | 3/2015 | Derenne et al. |
| 2015/0170373 A1* | 6/2015 | Yonaha .................. G06T 7/001 |
| | | 382/143 |
| 2015/0192525 A1 | 7/2015 | Sinbar et al. |
| 2015/0269742 A1* | 9/2015 | Bergstrom ............... G06T 5/50 |
| | | 348/164 |
| 2015/0347832 A1 | 12/2015 | Shutt |
| 2015/0379712 A1 | 12/2015 | Guissin et al. |
| 2016/0065909 A1 | 3/2016 | Derenne et al. |
| 2016/0199260 A1 | 7/2016 | Andersen, Sr. |
| 2016/0323522 A1 | 11/2016 | Heinke et al. |
| 2016/0364858 A1 | 12/2016 | Butte et al. |
| 2017/0015445 A1* | 1/2017 | Holmes .................. G07F 11/60 |
| 2017/0020785 A1 | 1/2017 | McCullough |
| 2017/0061663 A1 | 3/2017 | Johnson et al. |
| 2017/0081069 A1 | 3/2017 | Murokh |
| 2017/0163972 A1 | 6/2017 | Köhler et al. |
| 2017/0227942 A1 | 8/2017 | Thomson et al. |
| 2017/0254762 A1 | 9/2017 | Zoo |
| 2017/0301087 A1 | 10/2017 | Yuyama et al. |
| 2017/0305589 A1* | 10/2017 | Yuyama .................. B65B 35/26 |
| 2017/0312182 A1 | 11/2017 | Ma |
| 2017/0354574 A1 | 12/2017 | Feng et al. |
| 2017/0357775 A1 | 12/2017 | Ekin |
| 2017/0358621 A1 | 12/2017 | Jiang et al. |
| 2018/0068087 A1 | 3/2018 | Garcia et al. |
| 2018/0091745 A1* | 3/2018 | Holmes ................. H04N 5/2256 |
| 2018/0170591 A1 | 6/2018 | Koike et al. |
| 2018/0177682 A1 | 6/2018 | Tanaka |
| 2018/0225818 A1 | 8/2018 | Jacobs et al. |
| 2020/0143545 A1* | 5/2020 | Weng ...................... G05D 1/12 |
| 2020/0342972 A1* | 10/2020 | Chudy .................. G16H 20/60 |
| 2021/0274109 A1* | 9/2021 | Holmes .............. H04N 5/23229 |

FOREIGN PATENT DOCUMENTS

| | | | |
|---|---|---|---|
| WO | 2013129099 A1 | 9/2013 | |
| WO | 2013181416 A1 | 12/2013 | |
| WO | 2014119994 A1 | 8/2014 | |
| WO | WO-2014119994 A1 * | 8/2014 | ......... G01N 21/9508 |
| WO | 2016047569 A1 | 3/2016 | |
| WO | WO-2016047295 A1 * | 3/2016 | ................ A61J 1/03 |
| WO | WO-2016047569 A1 * | 3/2016 | ............. B65B 35/26 |

OTHER PUBLICATIONS

R. Palenychka, A. Lakhssassi and M. Palenychka, "Verification of Medication Dispensing Using the Attentive Computer Vision Approach," 2018 IEEE International Symposium on Circuits and Systems (ISCAS), 2018, pp. 1-4, doi: 10.1109/ISCAS.2018.8351202. (Year: 2018).*

* cited by examiner

VERIFICATION SYSTEM FOR A PHARMACY PACKAGING SYSTEM

CROSS-REFERENCE TO RELATED APPLICATIONS

This application is a continuation-in-part of U.S. patent application Ser. No. 16/821,823, filed on Mar. 17, 2020, which is a continuation of U.S. patent application Ser. No. 16/216,184, filed on Dec. 11, 2018, which is a continuation of U.S. patent application Ser. No. 15/277,493, filed Sep. 27, 2016, the entire contents of all of which are incorporated by reference herein.

FIELD OF THE INVENTION

The present invention relates to pharmacy packaging systems and, more particularly, to verification systems for pharmacy packaging systems.

SUMMARY

One embodiment provides a pharmacy packaging system including a feed roll for forming a pharmaceutical pouch, a dispenser configured to dispense pharmaceuticals into the pharmaceutical pouch formed by the feed roll, and a verification system. The verification system includes a camera system configured to capture images in a visible spectrum and an infrared spectrum, a first light source configured to output infrared spectrum light, a second light source configured to output visible spectrum light, and a processor communicatively coupled to the camera system, the first light source, and the second light source. The processor is operable to activate the first light source to illuminate the pharmaceutical pouch and capture a first image, using the camera system, of the pharmaceutical pouch while illuminated by the first light source. The processor is also operable to activate the second light source to illuminate the pharmaceutical pouch and capture a second image, using the camera system, of the pharmaceutical pouch while illuminated by the second light source. The processor is further operable to generate a third image based on the first image and the second image and generate a dashboard to simultaneously display first images, second images, and third images from a plurality of pharmaceutical pouches, wherein the first images, the second images, and the third images are arrayed in a grid on the dashboard. The processor is also operable to provide a number of pills indication of a number of pills detected in the pouch against a number of pills expected in the pouch.

Another embodiment provides a method of verifying pharmaceuticals packaged within a pharmaceutical pouch using a pharmacy packaging system. The pharmacy packaging system includes a feed roll for forming the pharmaceutical pouch, a dispenser configured to dispense pharmaceuticals into the pharmaceutical pouch formed by the feed roll, a camera system configured to capture images in a visible spectrum and an infrared spectrum, a first light source configured to output an infrared spectrum light, a second light source configured to output a visible spectrum light, and a processor communicatively coupled to the camera system, the first light source, and the second light source. The method includes activating, by the processor, the first light source to illuminate the pharmaceutical pouch and capturing a first image, by the processor using the camera system, of the pharmaceutical pouch while illuminated by the first light source. The method also includes activating, by the processor, the second light source to illuminate the pharmaceutical pouch and capturing a second image, by the processor using the camera system, of the pharmaceutical pouch while illuminated by the second light source. The method further includes generating, by the processor, a third image based on the first image and the second image and generating, by the processor, a dashboard to simultaneously display first images, second images, and third images from a plurality of pharmaceutical pouches, wherein the first images, the second images, and the third images are arrayed in a grid on the dashboard. The method also includes providing a number of pills indication of a number of pills detected in the pouch against a number of pills expected in the pouch and displaying the dashboard.

Other aspects of the invention will become apparent by consideration of the detailed description and accompanying drawings.

BRIEF DESCRIPTION OF THE DRAWINGS

FIG. 14 illustrates a dashboard generated to verify the pharmaceuticals in a pouch.

FIG. 15 illustrates a dashboard generated to verify the pharmaceuticals in a pouch.

FIG. 16 illustrates a dashboard generated to verify the pharmaceuticals in a pouch.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Packaging System

Figure 1:
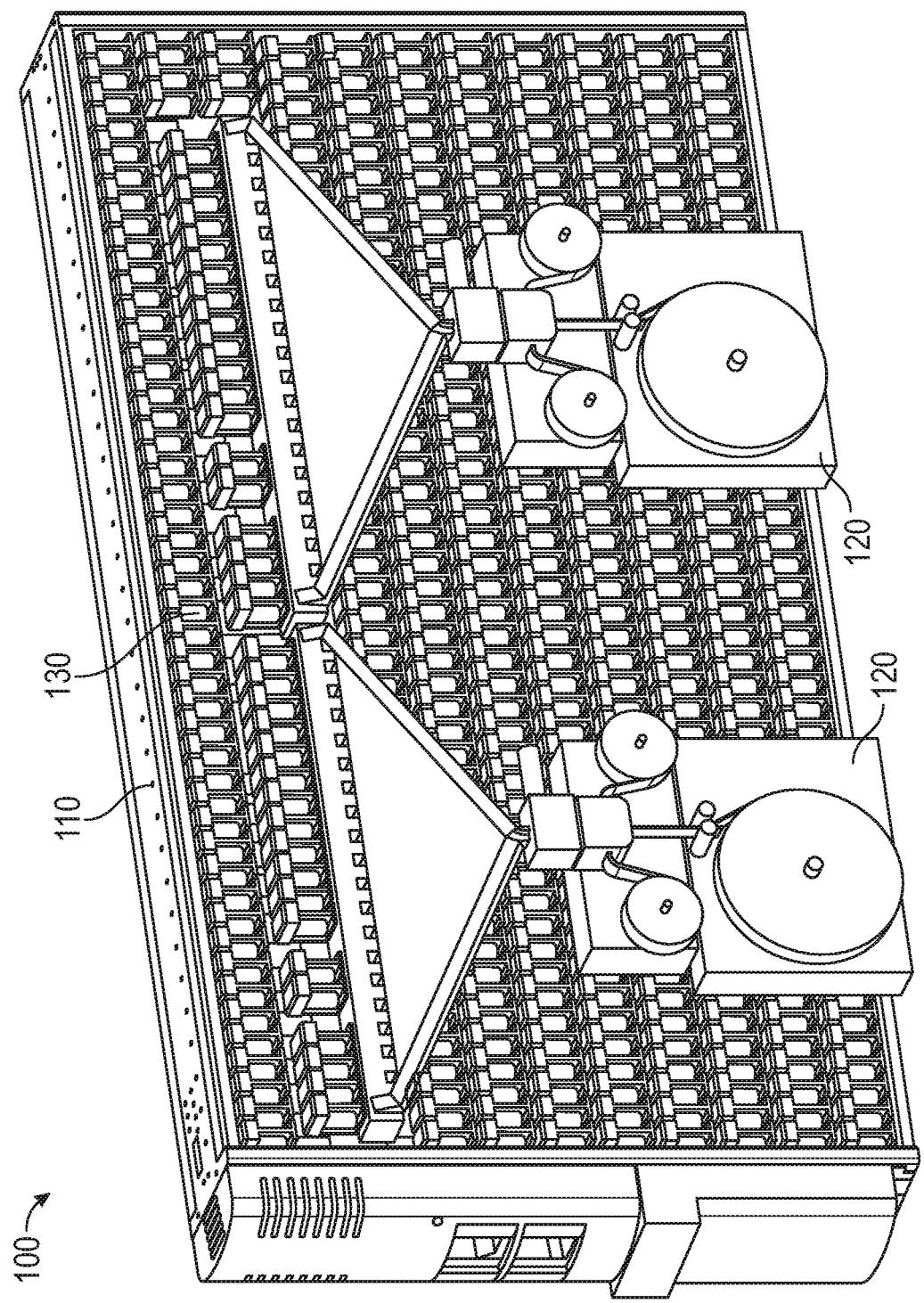
FIG. 1 is a perspective view of a pharmacy packaging system according to one embodiment of the invention.

FIG. 1 illustrates one embodiment of a pharmacy packaging system 100. In the example illustrated, the pharmacy packaging system 100 includes a storage unit 110 and two automatic packaging units 120. The storage unit 110 stores a plurality of canisters 130 containing a variety of pharmaceuticals. The canisters 130 may be containers or cassettes containing a variety of pharmaceuticals. The packaging units 120 package pharmaceuticals from those canisters 130 into pouches for distribution to patients. In some embodiments, the pharmacy packaging system 100 may include fewer or more packaging units 120. Additionally or alternatively, the packaging units 120 may be positioned on both sides of the storage unit 110. For example, the pharmacy packaging system 100 may include four packaging units 120, with two packaging units 120 positioned on each side of the storage unit 110. Such an arrangement allows multiple, independent packaging units 120 to access the same pharmaceutical array. FIG. 1 illustrates only one exemplary embodiment of the pharmacy packaging system 100. In other embodiments, the pharmacy packaging system 100 may include more of fewer components and may perform functions that are not explicitly described herein.

Figure 2:
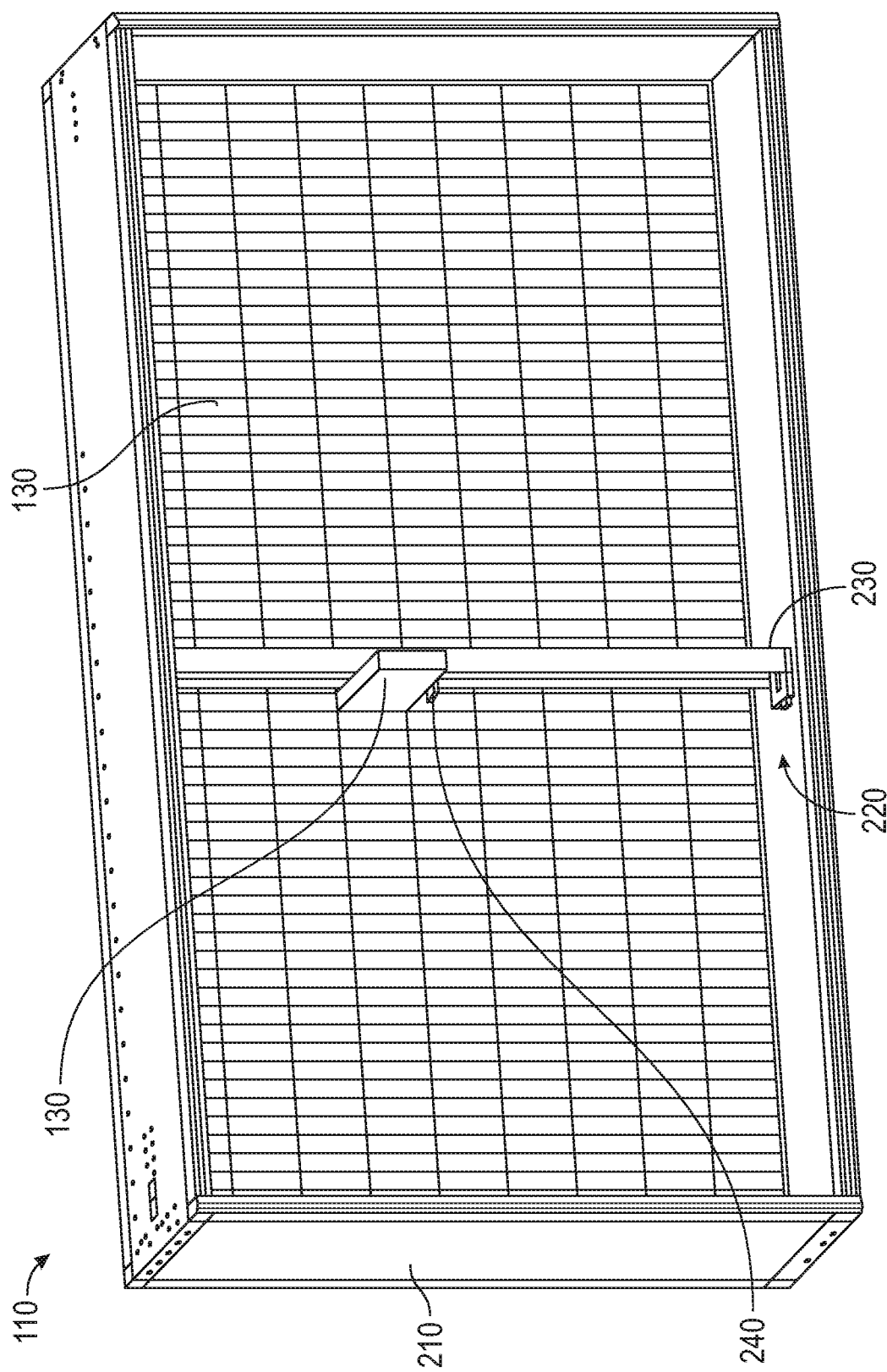
FIG. 2 is a perspective view of a storage unit of the pharmacy packaging system shown in FIG. 1.

FIG. 2 illustrates one embodiment of the storage unit 110. In the example illustrated, the storage unit 110 includes a frame 210 and a gantry assembly 220. The frame 210 includes a plurality of shelves or other supports for storing the canisters 130 in an array of rows and columns. The gantry assembly 220 is coupled to the frame 210 for retrieving canisters 130 from within the frame 210. The gantry assembly 220 is a canister-moving assembly that is operable to move the canisters 130 within the frame 210. The gantry assembly 220 includes a track 230 and a robotic head 240 that is operable to move along the track 230 to retrieve the canisters 130. The track 230 is movable horizontally within the frame 210 to align the robotic head 240 with a specific column of canisters 130. The robotic head 240, or carriage assembly, is movable vertically along the track 230 to align with a specific row of canisters 130. When the robotic head 240 is aligned with the desired canister 130, the robotic head 240 grabs the canister 130 and carries the canister 130 to one of the automatic packaging units 120, as further described below. The robotic head 240 can also retrieve a canister 130 from the packaging unit 120 and return the canister 130 to the proper column and row within the frame 210. FIG. 2 illustrates only one exemplary embodiment of the storage unit 110. In other embodiments, the storage unit 110 may include more of fewer components and may perform functions that are not explicitly described herein.

Figure 3:
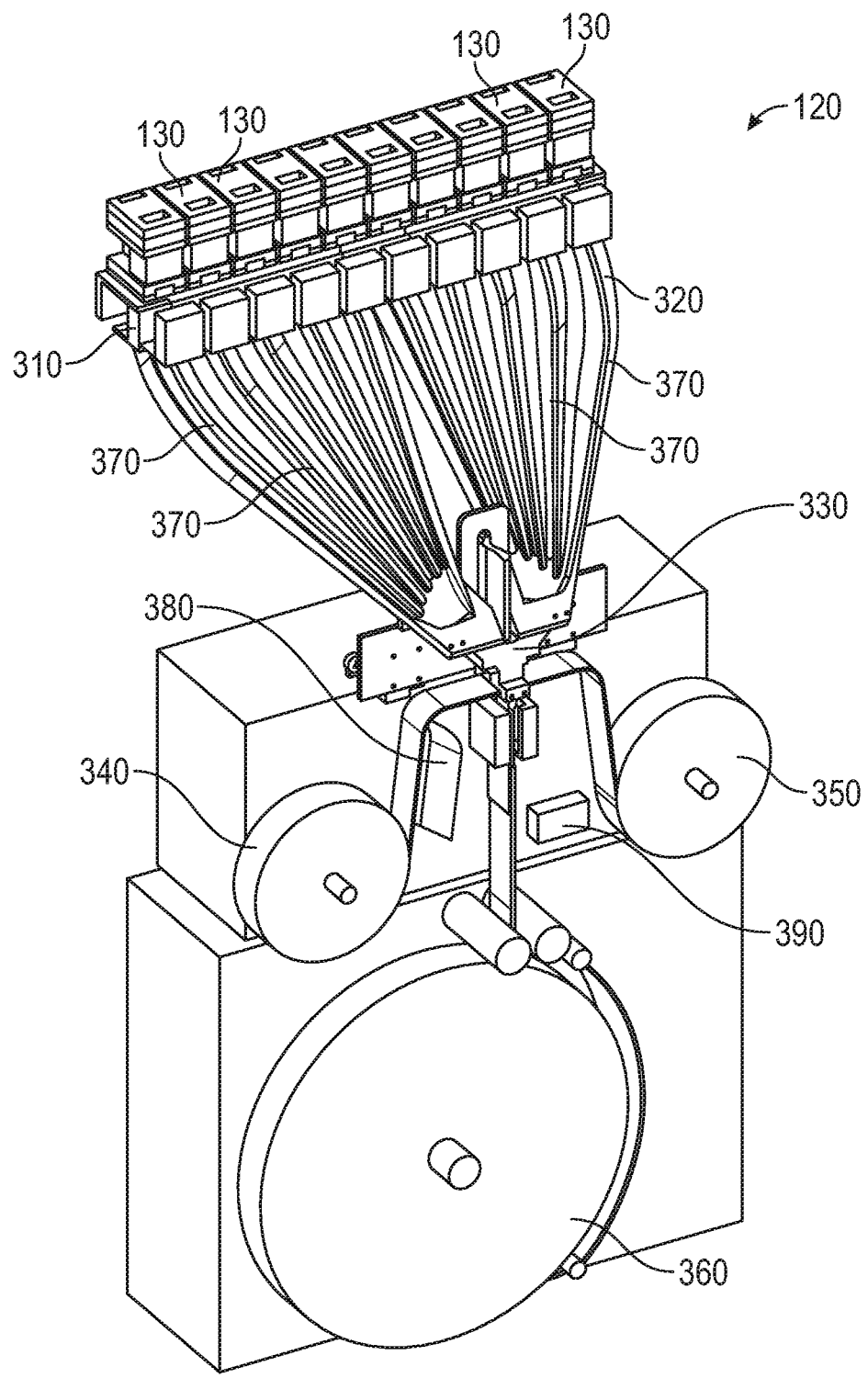
FIG. 3 is a perspective view of an automatic packaging unit of the pharmacy packaging system shown in FIG. 1.

FIG. 3 illustrates one embodiment of the automatic packaging unit 120. In the example illustrated, the packaging unit 120 includes a motor base 310, a manifold 320, a receptacle 330, two feed stock rolls 340, 350, and a take-up roll 360. Canisters 130 are placed on top of the motor base 310. The motor base 310 is offset from the shelves of the frame 210 and includes a ledge for supporting the canisters 130. When positioned adjacent the storage unit 110, the illustrated motor base 310 is only offset from the shelves a relatively short distance to reduce the range of horizontal movement required by the gantry assembly 220 to place canisters 130 on or remove canisters 130 from the ledge. The motor base 310 includes one or more motors operable to operate the active canisters 130 to dispense the pharmaceuticals stored within the canisters 130. The motor base 310 may also include one or more cameras or other sensors to verify whether pills were dispensed from the canisters 130 and/or to capture images of the pills as they are dispensed from the canisters 130. The motor base 310 thereby provides dispensing areas for the active canisters 130.

The manifold 320, or chute, includes a plurality of discrete tracks 370 corresponding to each of the canisters 130 mounted on the motor base 310. The illustrated tracks 370 are independent channels that together form the manifold 320. The tracks 370 direct pharmaceuticals from the motor base 310 toward packaging equipment of the packaging unit 120. The motor base 310 is positioned generally above the packaging equipment such that pharmaceuticals slide down the manifold 320 toward the packaging equipment. The tracks 370 isolate the pharmaceuticals from each other as the pharmaceuticals slide down the manifold 320 to the receptacle 330.

The receptacle 330 collects the pharmaceuticals from the manifold 320. After the pharmaceuticals pass through to the receptacle 330, the pharmaceuticals are sandwiched between two strips of material (e.g., plastic, paper, etc.) from the feed stock rolls 340, 350. The first feed roll 340 may be made of a first material that is white in color (e.g., a translucent material). The second feed roll 350 may be made of a second material that is clear (e.g., a transparent material) to allow a pharmacist to look through the pouch to see the pharmaceuticals inside the pouch. The two strips of material are then heat sealed together to form a pouch for the pharmaceuticals. In some embodiments, the packaging unit 120 may include a single feed stock roll having a single strip of material that is folded and/or heat sealed to form pouches. Once filled and sealed, the pouches are wrapped around the take-up roll 360 to create a single spool of pouches. The spool may correspond to pharmaceuticals requested by a particular patient or a particular facility. In other embodiments, the pouches may be cut and separated as they are filled, rather than spooled onto the take-up roll 360 continuously. The pouches are dispensed through, for example, a dispenser or dispensing port connected to the pharmacy packaging system 100.

In some embodiments, each packaging unit 120 may include a printer 380 to print a patient's name, the date, the amount and type of pharmaceuticals contained within, a bar code, and/or other indicia on the pouches as the pouches are formed. The printer 380 may be, for example, a thermal printer. In other embodiments, the printer 380 may include an ink ribbon or an ink jet. In addition, each packaging unit 120 may include a bar code scanner or vision system 390 to monitor and check the pouches as they are spooled onto the take-up roll 360 or dispensed.

Figure 4:
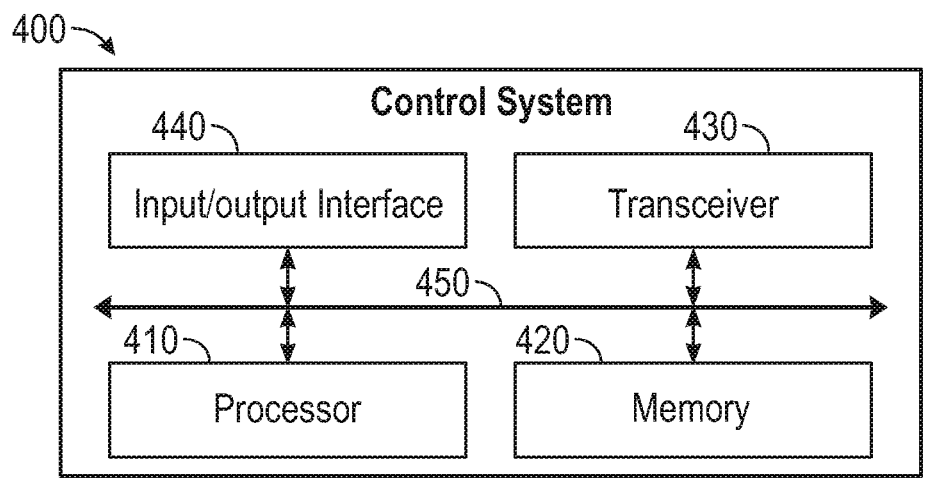
FIG. 4 is a control system included in the pharmacy packaging system shown in FIG. 1.

FIG. 4 illustrates one embodiment of a control system 400 for the pharmacy packaging system 100. The control system 400 is electrically coupled to the packaging equipment and the gantry assembly 220 to control operation of the pharmacy packaging system 100. In particular, the control system 400 coordinates movement of the gantry assembly 220 to move the canisters 130 between the storage unit 110 and the packaging unit 120, controls operation of the feed stock rolls 340, 350 to release and form a pharmaceutical pouch, and controls when the active canisters 130 positioned on the motor base 310 are opened and closed.

In the example illustrated, the control system 400 includes a processor 410, a memory 420, a transceiver 430, and an input/output interface 440. The processor 410, the memory 420, the transceiver 430, and the input/output interface 440 communicate over one or more control and/or data buses (e.g., a communication bus 450). FIG. 4 illustrates only one exemplary embodiment of a control system 400. The control system 400 may include more or fewer components and may perform functions other than those explicitly described herein.

In some embodiments, the processor 410 is implemented as a microprocessor with separate memory, such as the memory 420. In other embodiments, the processor 410 may be implemented as a microcontroller (with memory 420 on the same chip). In other embodiments, the processor 410 may be implemented using multiple processors. In addition, the processor 410 may be implemented partially or entirely as, for example, a field-programmable gate array (FPGA), an application specific integrated circuit (ASIC), and the like, and the memory 420 may not be needed or be modified accordingly. In the example illustrated, the memory 420 includes non-transitory, computer-readable memory that stores instructions that are received and executed by the processor 410 to carry out functionality of the control system 400 described herein. The memory 420 may include, for example, a program storage area and a data storage area. The program storage area and the data storage area may include combinations of different types of memory, such as read-only memory and random-access memory.

The transceiver 430 enables wireless communication from the control system 400 to, for example, a remote electronic device such as a server or a smart telephone or a tablet computer of a remote pharmacist. In other embodiments, rather than the transceiver 430, the control system 400 may include separate transmitting and receiving components, for example, a transmitter and a receiver. In yet other embodiments, the control system 400 may not include a transceiver 430 and may communicate with a remote device via a network interface and a wired connection to a communication network such as the Internet.

As noted above, the control system 400 may include the input/output interface 440 (or more commonly referred to as a user interface). The input/output interface 440 may include one or more input mechanisms (e.g., a touch screen, a keypad, a button, a knob, and the like), one or more output mechanisms (e.g., a display, a printer, a speaker, and the like), or a combination thereof. The input/output interface 440 receives input from the input devices actuated by a user, and provides output to the output devices with which a user interacts. In some embodiments, as an alternative or in addition to managing inputs and outputs through the input/output interface 440, the control system 400 may receive user inputs, provide user outputs, or both by communicating with an external device, such as a console computer, over a wired or wireless connection.

A user can interact with the packaging unit 120 through the control system 400 to input patient information, facility information, and/or the pharmaceuticals needed. The control system 400 can control movement of the gantry assembly 220 to move the canisters 130 from the shelves of the storage unit 110 to one of the motor bases 310. In addition, the control system 400 can control operation of the motor bases 310 to selectively open and close the canisters 130. Furthermore, the control system 400 may optimize orders by minimizing movement of the gantry assembly 220 and the canisters 130 or by filling all the orders for a particular patient or facility consecutively.

Figure 5:
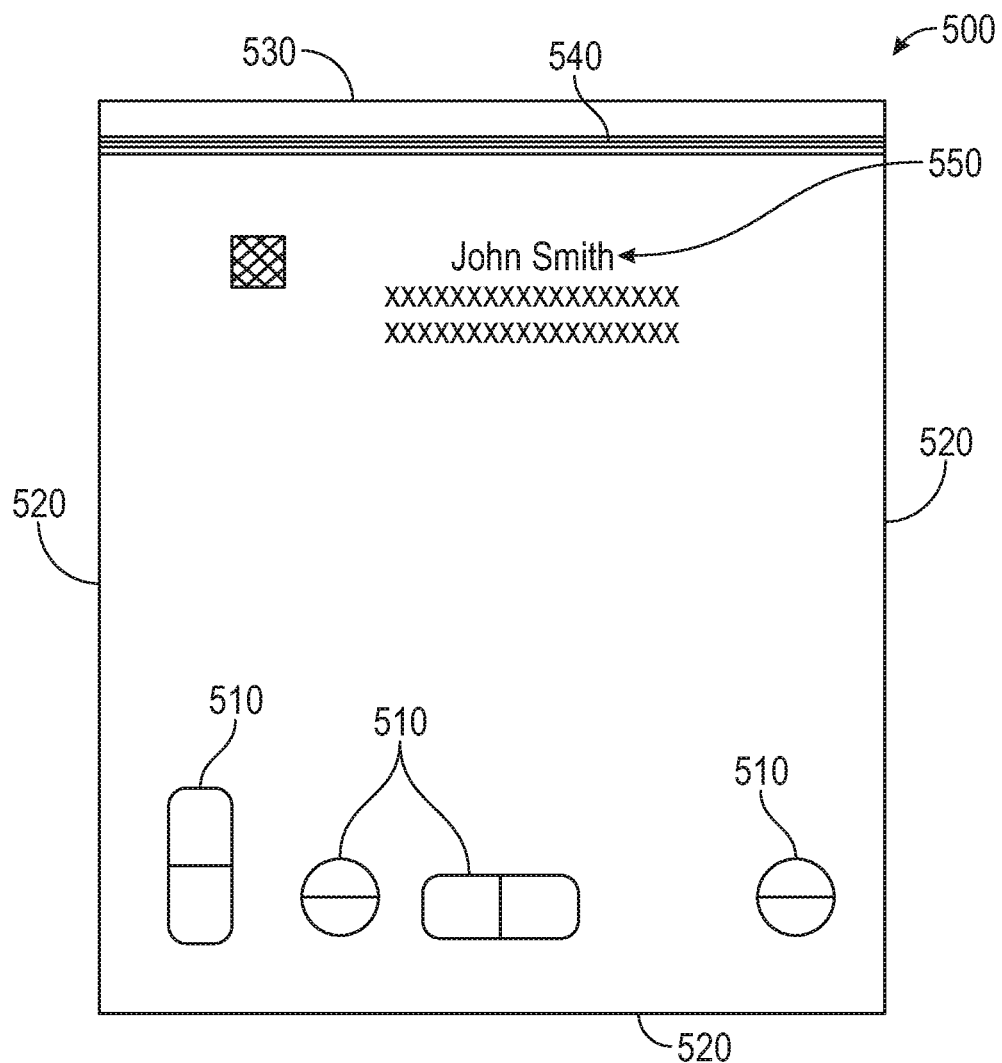
FIG. 5 illustrates a pouch with pharmaceuticals packaged inside.

FIG. 5 illustrates a pouch 500 containing different pharmaceuticals 510 therein. The illustrated pouch 500 is an example of a pouch that may be formed using the packaging equipment of the packaging unit 120 described above. The pouch 500 may be a plastic bag having three closed edges 520 and an open edge 530. A heat seal 540 extends across the pouch 500 adjacent the open edge 530 to seal the pouch 500. In some embodiments, all four edges 520, 530 of the pouch 500 may be closed via heat seals. Additionally or alternatively, the pouch 500 may be composed of an opaque and/or non-plastic material. For example, one or both sides of the material may be opaque or colored (e.g., white or amber colored). As discussed above, identification indicia 550 (e.g., a patient's name, a barcode, types of pharmaceuticals, etc.) are printed on the pouch 500 using, for example, a thermal printer, an inkjet printer, a thermal transfer ribbon, or the like. In other embodiments, the identification indicia 550 may be printed on a label that is coupled to the pouch 500 with adhesives. In further embodiments, the pouch 500 may include a header area and/or a footer area without medication, but that provides space to print or apply the identification indicia 550.

Verification System

Figure 6:
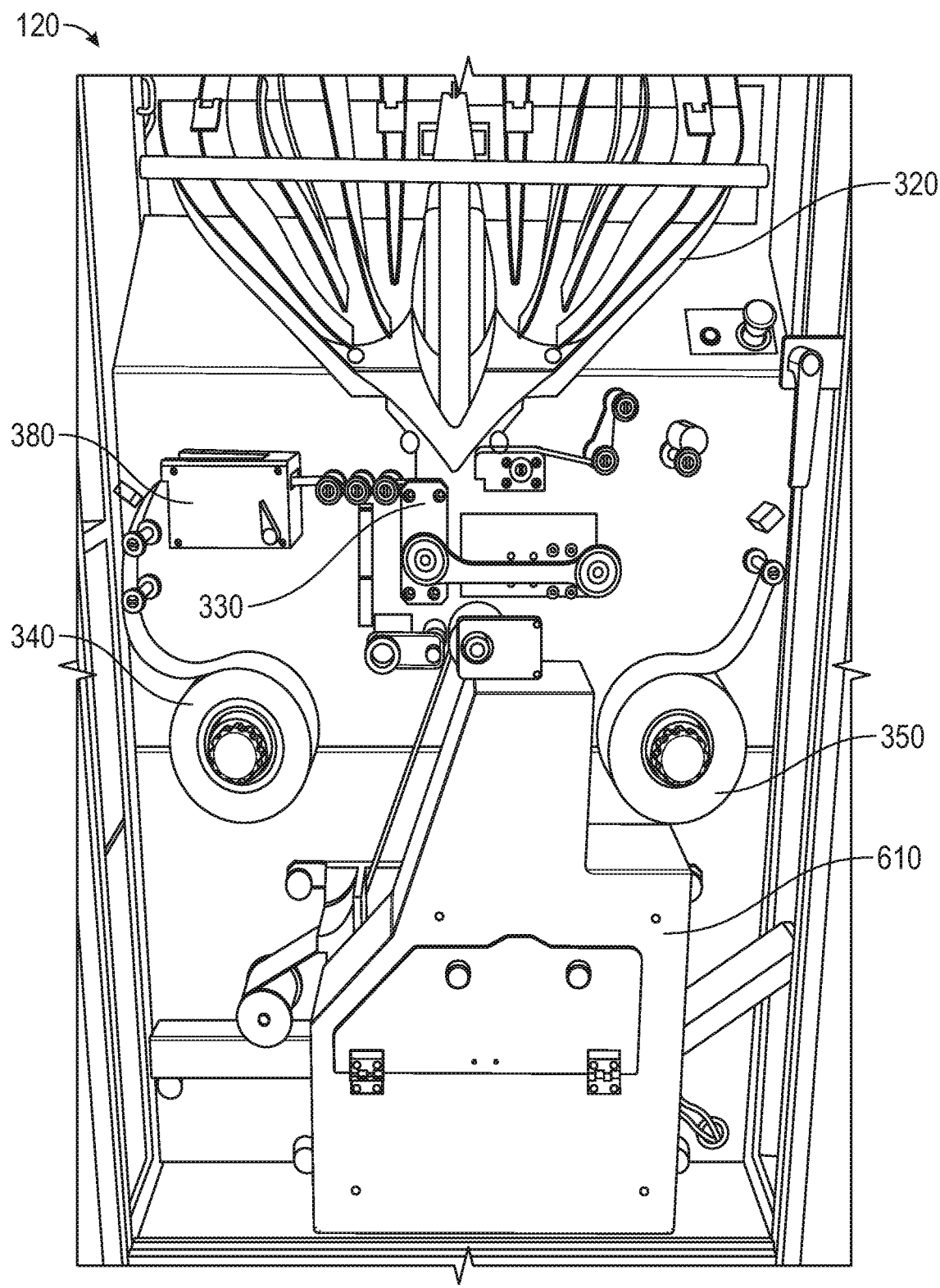
FIG. 6 is a front view of the packaging unit of FIG. 3.

FIG. 6 illustrates another view of the packaging unit 120. In the example illustrated, the packaging unit 120 also includes a verification system 610. The verification system 610 is positioned downstream of the receptacle 330 and the pouch sealing mechanism, between the feed stock rolls 340, 350 and the take-up roll 360 (or dispenser). As further described below, the verification system 610 includes components to compare the actual contents of a filled pharmaceutical pouch to the expected contents of the pouch.

Figure 7:
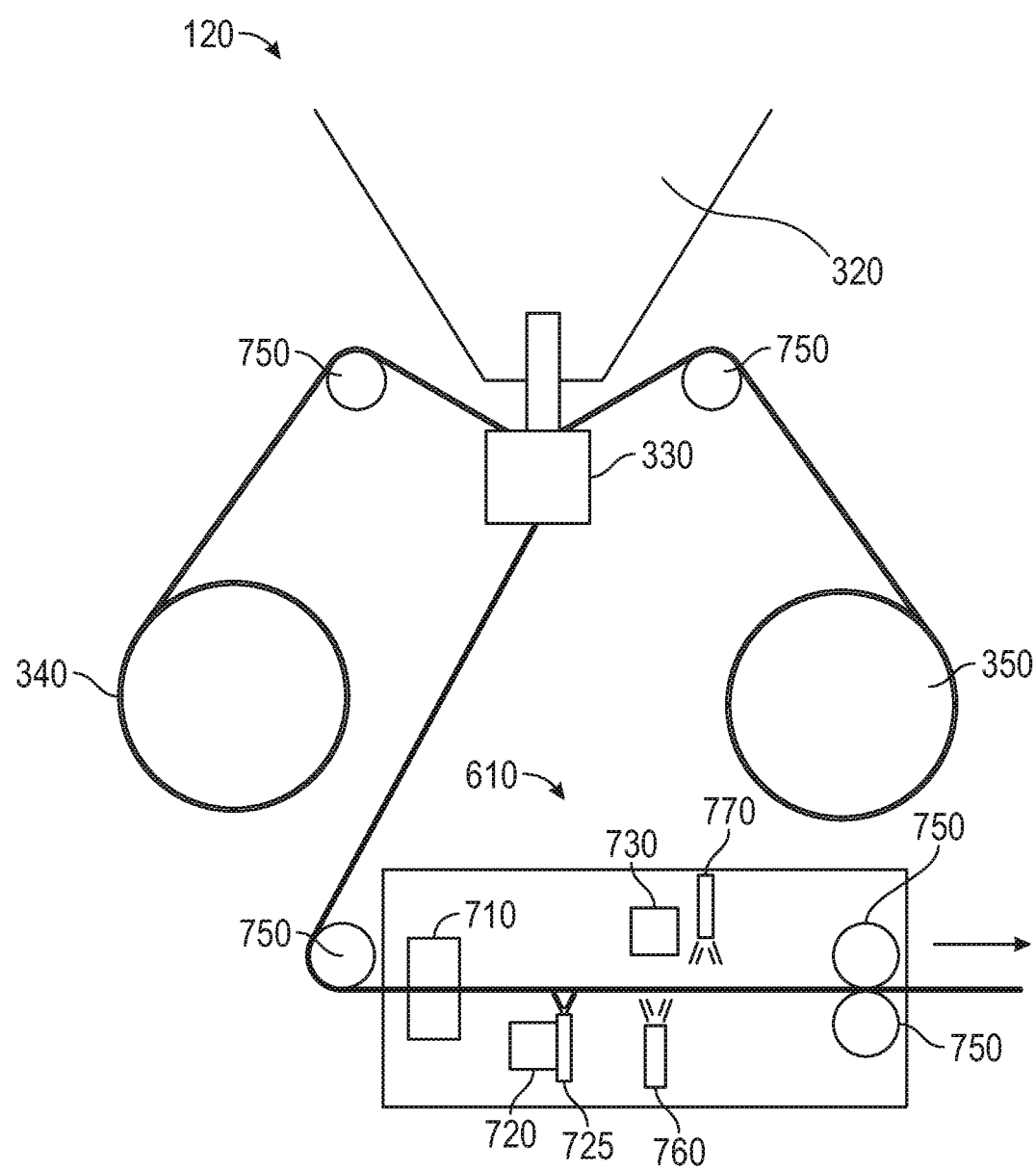
FIG. 7 is a schematic of a verification system of the packaging unit of FIG. 6.

FIG. 7 is a schematic of part of the packing unit 120 including the verification system 610. The verification system 610 provides a final check of the filled pouches before the pouches are distributed. In the example illustrated, the verification system 610 includes an agitator 710, a sensor 720, and a camera system 730 comprised of one or more cameras. In other embodiments, the verification system 610 may include fewer or more cameras. After the pouches are filled and sealed, the strip of pouches is directed by sheaves or pulleys 750 into the verification system 610. At least some of the sheaves may be driven by, for example, motors to move the strip of pouches.

As the pouches enter the verification system 610, the agitator 710 engages (e.g., agitates, vibrates, etc.) the pouches to help the pharmaceuticals within each pouch settle and separate or spread out. In some embodiments, the agitator 710 may include fingers, brushes, or the like that engage and agitate the pouches. Additionally, the fingers or brushes may be driven by, for example, a vibration motor to help agitate the pouches and move the pharmaceuticals around within each pouch. In other embodiments, the fingers or brushes may be passive elements that help comb the pharmaceuticals apart. In further embodiments, the agitator 710 may be omitted.

After the pouches are agitated, the pouches pass a sensor 720. In some embodiments, the sensor 720 may be, for example, a barcode scanner, a QR code reader, or an image sensor. In other embodiments, the sensor 720 may be a label camera that captures images. The sensor 720 is positioned on one side of the pouches (e.g., a label side of the pouches) and reads a code or captures an image of the label on each pouch. A light source 725 (e.g., a visible light) is also positioned on the same side of the pouches as the sensor 720 to selectively illuminate the pouches while the sensor 720 reads codes or captures images. The sensor 720 can communicate with the processor 410 and memory 420 of the control system 400 to store the image or data related to the read/scanned code. The processor 410 can also control operation of the light source 725 (e.g., when the light source 725 is turned on and off).

The pouches then pass the camera system 730. In the example illustrated, the camera system 730 includes a single camera with an infrared filter removed to capture both infrared images and the visible light images. The camera system 730 is positioned on an opposite side of the pouches (e.g., on the side of the pouches facing the transparent material) from the sensor 720 so the labels on the pouches do not interfere with the camera system 730. A first light source 760 (e.g., an infrared (IR) or near infrared (NIR) spectrum light) is positioned on a side of the pouches opposite the camera system 730 (e.g., the side of the pouches facing the translucent material and label). The first light source 760 shines light through the pouches toward the camera system 730 to illuminate the pouches. Light from the first light source 760 passes through the labels so that the pharmaceuticals within each pouch cast shadows against, for example, the opaque or translucent white paper of the labels. As described above, in some embodiments, the label information on the pharmaceutical pouch is printed by a thermal printer. In these embodiments, the label information lets infrared light through the printed indicia without causing a reflection on the white paper or plastic that makes up one-half of the pharmaceutical pouch. The camera system 730 can then capture an image of the shadows cast by the pharmaceuticals within each pouch without any additional shadows or noise created by the label information. Similar to the sensor 720, the camera system 730 can communicate with the processor 410 and memory 420 to store the image.

As the pouches are positioned under the camera system 730, a second light source 770 also illuminates the pouches. The second light source 770 (e.g., a visible spectrum light) is positioned on the same side of the pouches as the camera system 730 (e.g., on the side of the pouches facing the transparent material) to shine light on the pouch and illuminate the contents of the pouch. When the second light source 770 illuminates the pouches, the camera system 730 captures a visible light image of each pouch, showing the color, shape, contour, surface finish, etc. of each pharmaceutical. In the illustrated embodiment, the pouches are stopped under the camera system 730 to capture the IR image and the visible light image. The camera system 730 captures both images without moving so the images are lined-up for computer manipulation.

In the illustrated embodiment, the first light source 760 and the second light source 770 operate in relatively rapid succession. For example, the first light source 760 can be turned on to briefly illuminate a pouch with infrared light, and the camera system 730 can capture an image of the pouch while the pouch is illuminated with the infrared light. Then, the first light source 760 can be turned off, the second light source 770 can be turned on to briefly illuminate the pouch with visible light, and the camera system 730 can capture an image of the pouch while the pouch is illuminated with the visible light (and before the pouch is disturbed/moved). In some embodiments, the order in which the light sources 760, 770 are turned on and the images are captured may be reversed (e.g., the camera system 730 may first capture an image of the pouch while the pouch is illuminated with visible light, and then capture an image of the pouch while the pouch is illuminated with infrared light). In further embodiments, the camera system 730 may capture another image while both light sources 760, 770 are on.

Although the camera system 730 is described as having a single camera with the infrared filter removed, in other embodiments, the camera system 730 may include two separate cameras. For example, one camera may be an infrared (IR) or near infrared (NIR) camera that operates in conjunction with the first light source 760 to capture images in the infrared spectrum, and the other camera may be a color camera or visible spectrum camera that operates in conjunction with the second light source 770 to capture images in the visible spectrum.

In some embodiments, the verification system 610 may provide real-time monitoring of the pharmaceutical pouches as they pass through the system. For example, after the camera system 730 captures an infrared image of a pouch, the processor 410 analyzes the image to determine the number and approximate size of each pharmaceutical within the pouch. Based on the label (which is associated with an expected prescription order), the processor 410 determines whether the correct number of pharmaceuticals were loaded into the pouch. In addition, after the camera system 730 captures a visible light image of the pouch, the processor 410 analyzes the image (in conjunction with the infrared image and the data from the label) to verify that each pouch is properly filled with the correct type of pharmaceuticals. Once the pouches are verified, the pouches are directed to the take-up roll 360, a bin, or other location for distribution.

When the verification system 610 determines that a pouch is improperly filled, the verification system 610 can provide immediate feedback to discard the pouch and/or fill a new pouch. For example, the verification system 610 can include a printer or other device to mark an improperly filled pouch with a large X, a colorful dot, a spray, or the like to identify that the pouch has an error. A pharmacist or other technician can then discard this pouch before the pouch is distributed. In addition, the verification system 610 can communicate with the packaging unit 120 to notify the packaging unit 120 to fill another pouch with the same prescription order, without having to wait for further input from the pharmacist or other technician. As such, disruptions to the packaging system are reduced.

Chain of Custody

Figure 8:
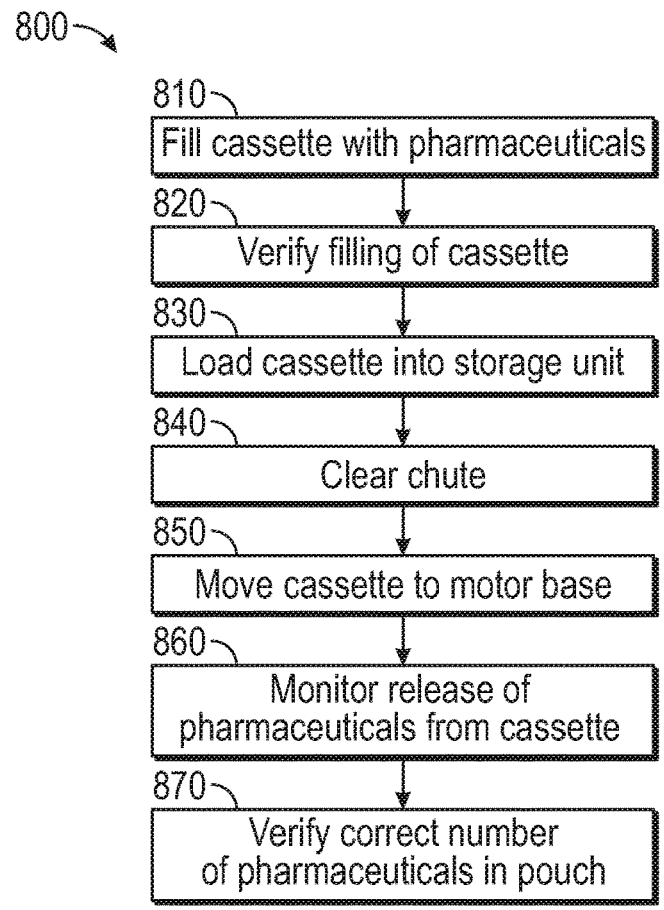
FIG. 8 is a flowchart depicting a method of operating a pharmacy packaging system according to one embodiment.

FIG. 8 depicts a method 800 of operating a pharmacy packaging system, such as the pharmacy packaging system 100 discussed above. The method 800 leverages the automated nature of the pharmacy packaging system to verify the correct type and/or number of pharmaceuticals are loaded into a pouch. In particular, the method 800 involves monitoring the pharmaceuticals from when the pharmaceuticals are loaded into a canister 130 until the pharmaceuticals are loaded and sealed in a pouch to create a chain of custody for the pharmaceuticals. This chain of custody may be stored as an electronic file in the non-transitory memory of the pharmacy packaging system or a remote computer or server.

First, a canister 130 is placed on a filling station (e.g., a platform, a countertop, a table, etc.) with the ability to read an RFID tag, or other information, of the canister 130. The filling station then prompts an operator (e.g., pharmacist, technician, or other authorized personnel) which National Drug Code (NDC) number is needed. The user is instructed to obtain a bulk storage bottle with this NDC number, and scans a barcode on the bulk storage bottle to verify it is correct. If the barcode does not match the expected NDC number, the canister 130 will not later be accepted by the packaging system 100 (e.g., a security door on the packaging system 100 will not open to allow the filled canister to be loaded into the system 100).

At step 810, the canister 130 (e.g., one of the cassettes/container) is filled with pharmaceuticals by the operator. The canister 130 is filled by opening the canister 130 and inserting the desired pharmaceuticals into the canister 130. After filling, the canister 130 is closed. In some embodiments, the canister 130 may be locked and tamper-proof such that only authorized personnel know how or are able to reopen the canister 130. During this filling step, a camera may be positioned (e.g., located over the top of the canister 130) to record that the canister 130 is filled. The camera can take pictures or record a video as the pharmaceuticals are poured into the canister 130. In some embodiments, the canister 130 may include an RFID tag or other identifier to help track the canister 130, as noted above.

At step 820, a pharmacist verifies the canister 130 was properly filled by either filling the canister 130 him or herself, or by watching a technician or other authorized personnel fill the canister 130 via a video or still images. The video may be a live stream of the filling or a replay of the filling. The pharmacist then logs that the canister 130 was properly filled into the electronic chain of custody file. Among other things, the pharmacist may enter his/her name, the date of filling, the type of pharmaceuticals, and/or the amount of pharmaceuticals into the electronic file. By recording the filling process, tagging the canister 130, and identifying the operator (e.g., through biometric, a login, etc.), the filled canister 130 can be certified as correctly filled by the remote pharmacist.

At step 830, the filled canister 130 is loaded into the pharmacy packaging system 100. For example, the canister 130 is inserted by operator into an input port (when the security door is open, if applicable) of the storage unit 110. The storage unit 110 scans a barcode, RFID tag, or other indicia on the canister 130 to identify the canister 130. Once verified as the correct canister 130 filled from the correct bulk storage bottle, the security door is closed. While the door is closed and no tampering is possible, the canister 130 is automatically weighed by a scale positioned in the input port to determine the number of pharmaceuticals that were added. This data can be stored by the system 100 to help accurately track on-hand inventory and avoid interruptions in production. The gantry assembly 220 of the storage unit 110 then moves the filled canister 130 from the input port to a suitable storage location. In some embodiments, the storage location may be randomized (i.e., the canister 130 is not always stored the same location) based on size, frequency of use, etc. As the gantry assembly 220 moves the filled canister 130, the packaging system automatically logs where the canister 130 is moved to in the electronic chain of custody file.

In some embodiments, the filled canister 130 may be loaded into the pharmacy packaging system 100 before the pharmacist verifies that the canister 130 was filled properly. In such embodiments, the pharmacist can verify proper filling of the canister 130 after the canister 130 is stored in the storage unit 110, or can flag that the canister 130 was improperly filled and needs to be corrected. The pharmacy packaging system 100 inhibits using the canister 130 to fill prescription orders until the canister 130 is verified by the pharmacist. In other embodiments, the canister 130 may be used to fill pouches, but the final pouches may not be released until the canisters 130 are verified by the pharmacist.

When a prescription order is to be filled, a technician or other personnel logs into the system 100 via biometrics, a passcode, or the like. The technician then verifies that the manifold 320 of the pharmacy packaging system is clear, at step 840. If necessary, the technician may remove any pharmaceuticals or other debris from the manifold 320. Once the manifold 320 is clear, the technician notifies the pharmacy packaging system 100 that the manifold 320 was inspected and to start filling the prescription order. In some embodiments, the technician may confirm that the manifold 320 is clear by pushing a button on or entering a code into the pharmacy packaging system 100.

After the manifold 320 is cleared, at step 850, the pharmacy packaging system 100 begins filling the prescription order. In particular, the gantry assembly 220 of the storage unit 110 retrieves the desired canister 130 and moves the canister 130 to the motor base 310 of the packaging unit 120. As discussed above, the motor base 310 can operate the canister 130 to release pharmaceuticals from the canister 130. The pharmaceuticals travel down the manifold 320 to be packaged into a pouch.

At step 860, the pharmacy packaging system 100 monitors the pharmaceuticals as the pharmaceuticals are released from the canister 130. For example, the motor base 310 may include a sensor (e.g., a light sensor, a laser beam or array, etc.) adjacent each outlet to verify whether a pharmaceutical was properly released from the canister 130. The sensor can also verify that only the expected number of pharmaceuticals (e.g., one) is being released from the canister 130. This information is logged in the electronic chain of custody file to record that the proper number of pharmaceuticals was released.

After the pharmaceuticals drop down the manifold 320 and are inserted into a pouch, at step 870, the pharmacy packaging system 100 verifies that the correct number of pharmaceuticals reached the pharmacy packaging system and was loaded into the pouch. For example, a sensor (e.g., an image sensor or camera) on the packaging unit 120 captures an image of the filled pouch. The image acquired by the sensor can be analyzed by the processor 410 of the pharmacy packaging system 100 or a remote computer for object recognition. That is, the processor 410 simply needs to detect that the correct number of objects reached the pouch, since the pharmaceuticals have been monitored and verified from the time of loading into the canister 130. When the expected number of objects is detected, the processor 410 logs this verification in the electronic chain of custody file. The pouch can then be released and delivered to a patient. On the other hand, if the processor 410 does not detect the expected number of objects, the pharmacy packaging system 100 can flag the pouch for further review by a pharmacist. The pharmacist then can manually verify whether the pouch was properly filled, discard the pouch, and/or refill the prescription order in a new pouch.

Method of Verifying Pharmaceuticals

Figure 9:
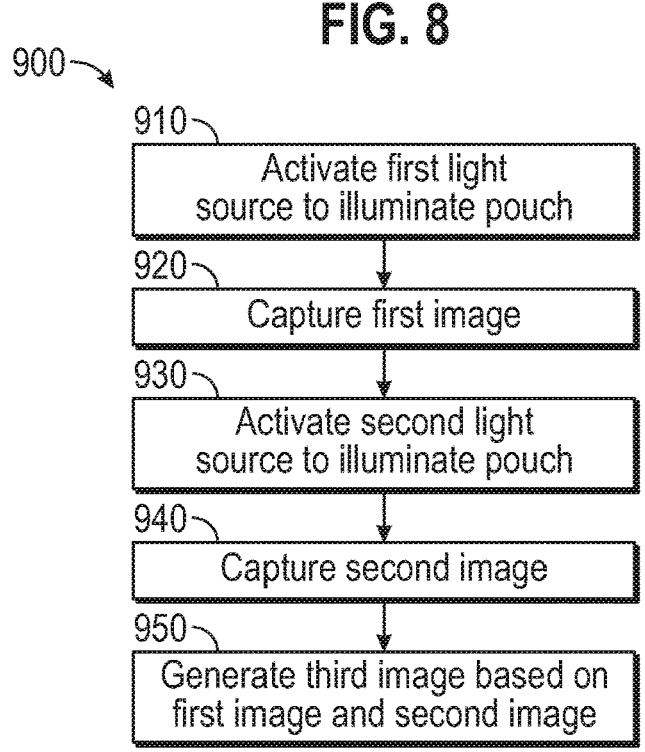
FIG. 9 is a flowchart depicting a method of verifying pharmaceuticals in a pouch according to one embodiment.

The method 800 depicted in FIG. 8 provides pharmacists with a high degree of certainty that a pharmaceutical pouch was properly filled because the pharmaceuticals are tracked from when they are loaded into a canister to when they are sealed in a pouch in a closed system. In some scenarios, however, the pharmacist may be required to verify the contents of a pouch after the pouch is filled. FIG. 9 is a flowchart illustrating one example method 900 for verifying pharmaceuticals in a pharmaceutical pouch dispensed by the pharmacy packaging system 100. The method 900 uses the verification system 610 described above with reference to FIG. 7. This method 900 may be used in combination with or as an alternative to the method 800.

After the pouches are filled, the pouches are directed into the verification system 610. In some embodiments, the agitator 710 (FIG. 7) may engage or agitate the pouches to help spread apart the pharmaceuticals within the pouch. In other embodiments, this step may be omitted.

Figure 10:
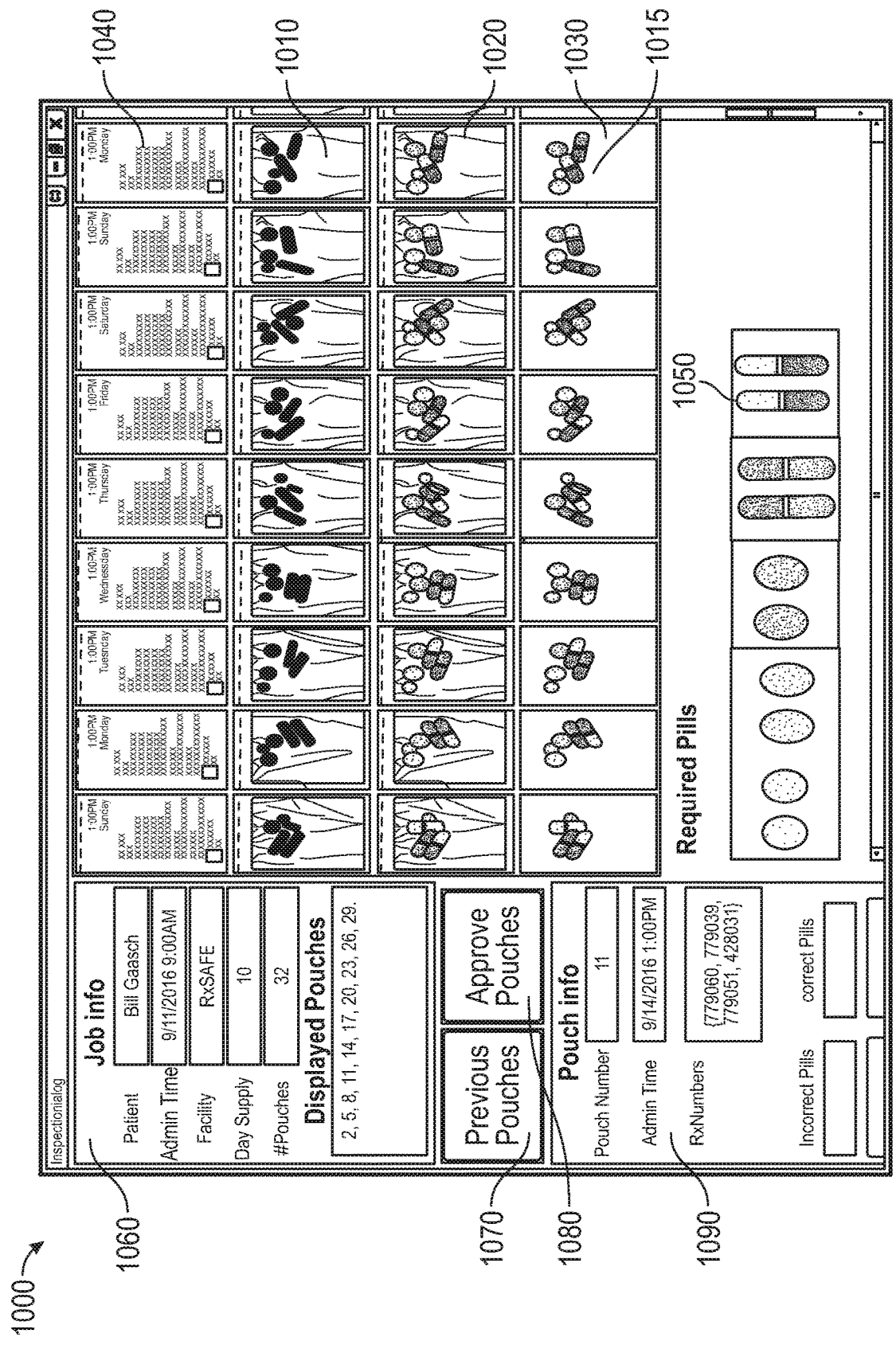
FIG. 10 illustrates a dashboard generated to verify the pharmaceuticals in a pouch according to one embodiment.

Once the pouches enter the verification system 610, the sensor 720 (e.g., label camera) can capture an image of the label on each pouch. The processor 410 sends a signal or command to the sensor 720 to capture the image. The processor 410 also directs the sensor 720 to store the captured image in the memory 420 or other suitable storage device. FIG. 10 shows an example of a label image 1040 that is captured by the sensor 720. In other embodiments, the sensor 720 may read a barcode or other indicia on the label, rather than capturing an image of the label itself. In such embodiments, the processor 410 may retrieve information regarding the pouch from a database and display the retrieved information in place of the label image 1040.

As illustrated in FIG. 9, the method 900 includes activating the first light source 760 to illuminate the pharmaceutical pouch when the pharmaceutical pouch is under the camera system 730 (at step 910). In the illustrated embodiment, the processor 410 sends a signal or command to the first light source 760 to turn the first light source 760 on. As explained above, the pharmaceutical pouch includes a translucent or opaque white material (e.g., paper, plastic, etc.) that makes up one side of the pouch, and a transparent material (e.g., plastic, etc.) that makes up the other side of the pouch. As can be seen from FIG. 7, when the pouch is under the camera system 730, the pouch is above the first light source 760. The pouch is positioned in the verification system 610 such that the white paper side is on the bottom side facing the first light source 760, while the transparent side is on the top side facing the camera system 730. When the first light source 760 illuminates the pouch, the pharmaceuticals within the pouch form shadows against the background of the white paper side of the pouch.

At step 920, the camera system 730 captures a first image of the pouch while the pouch is illuminated by the first light source 760. The processor 410 sends a signal or command to the camera system 730 to capture the image while the first light source 760 is on. The processor 410 also directs the camera system 730 to store the captured image in the memory 420 or other suitable storage device. FIG. 10 shows an example infrared image 1010 that is captured by the camera system 730. After the image is captured, the processor 410 sends a signal or command to the first light source 760 to turn the first light source 760 off.

As noted above, the label may be printed on the pouch by a thermal printer. In such embodiments, the infrared light from the first light source 760 passes through the indicia without the indicia appearing as "noise" on the image captured by the camera system 730. In embodiments where the label is applied to the pouch using other techniques, the indicia may need to be removed from the captured image. In such embodiments, the processor 410 can remove the indicia from the image using, for example, a software module in the control system 400. For example, the processor 410 can analyze the label image captured by the sensor 720 to determine the location of the indicia "noise." The processor 410 can then flip the label image (due to the orientation of the sensor 720 relative to the pouch versus the orientation of the camera system 730 relative to the pouch), and subtract the flipped label image from the infrared image captured by the camera system 730.

At step 930, the processor 410 activates the second light source 770 to illuminate the pharmaceutical pouch when the pharmaceutical pouch is under the camera system 730. In particular, the processor 410 sends a signal or command to the second light source 770 to turn the second light source 770 on. The second light source 770 illuminates the pouch such that the pharmaceuticals within the pouch are visible to the camera system 730 through the transparent side of the pouch.

At step 940, the camera system 730 captures a second image of the pouch. In the illustrated embodiment, the processor 410 sends a signal or command to the camera system 730 to capture the image while the second light source 770 is on. The processor 410 also directs the camera system 730 to store the captured image in the memory 420 or other suitable storage device. FIG. 10 shows an example visible light image 1020 that is captured by the camera system 730. After the image is captured, the processor 410 sends a signal or command to the second light source 770 to turn the second light source 770 off.

At step 950, the processor 410 generates a third image based on the first (i.e., infrared) image and the second (i.e., visible light) image. Several techniques are contemplated by this invention to generate the third image. One example technique of generating the third image includes super imposing the first image on the second image, and removing all other information from the second image that is not within the borders of the shadows created by the pharmaceuticals in the first image. Removing all other information may include, for example, filling regions in the third image that are not within the borders of the shadows created by the pharmaceuticals in the first image with a solid color (e.g., black). Another example technique includes filling in the colors from the second image corresponding to the shadow areas of the first image, and filling the remained of the image with a solid color (e.g., black). Once the third image is created, the processor 410 stores the image in the memory 420 or other suitable storage device. FIG. 10 shows an example third image 1030 generated by the processor 410.

In some embodiments, the pill images shown in the third image 1030 can be rearranged by the processor 410 on the solid background. For example, the processor 410 can reorganize the pill images in a row or column to align the pill images in the same order from pouch to pouch. Such an arrangement enhances the ability of a pharmacist to observe and inspect the individual pills in each pouch. Additionally, processor 410 can order the individual pill images in the same order as images of expected pills 1050 (FIGS. 10-12), which represent "gold images" of the pills from a database. Ordering the pill images in the same order as the expected pill images 1050 also enhances a pharmacist's ability to compare the actual pills in each pouch to the expected pills in each pouch.

The above-described methods 800 and 900 provide, among other things, verification that a pouch is filled with the proper type of pharmaceuticals because the pharmaceuticals are monitored from the time they are loaded into the canister 130 until they are dispensed to the customer. After the pharmaceuticals are loaded into a canister 130, the pharmaceuticals are maintained in a closed system that is generally not accessible to outside users. In addition, the methods 800 and 900 verify that the pouch is filled with the proper number of pharmaceuticals using relatively low-cost sensors (e.g., light sensors on the motor base 310, and an image sensor on the packaging unit 120). Further, the methods 800 and 900 create an electronic chain of custody file that can be referenced later, if necessary. The method 900 may also create a database of filled pouch images should it be necessary to review an allegedly faulty pouch at a later time.

Dashboard

FIG. 10 illustrates a dashboard 1000 that may be generated by the processor 410 to aid a pharmacist in verifying that the pouches are correctly filled. The dashboard 1000 is a compilation of images captured by the verification system 610 and generated by the processor 410. The dashboard 1000 may simultaneously display images from multiple pouches, or may only display images from one pouch at a time. In some embodiments, the dashboard 1000 may be displayed on a user interface (e.g., the input/output interface 440) of the pharmacy packaging system 100. In other embodiments, the dashboard 1000 may be sent to a computing device (e.g., a smart telephone or a tablet computer) of a remote pharmacist.

In the example illustrated, the dashboard 1000 includes an infrared first image 1010, a visible light second image 1020, a third image 1030 based on the first and second images 1010, 1020, label information 1040 (e.g., a label fourth image), and images of expected pills 1050. The illustrated dashboard 1000 also includes an interface for navigating the dashboard 1000, including patient information 1060, a "Previous Pouches" button 1070, an "Approve Pouches" button 1080, and pouch information 1090. As shown, the first image 1010, the second image 1020, the third image 1030, and the label information 1040 may be arrayed in a grid on the dashboard 1000, with each column of the grid corresponding to the images associated with one of the pouches. The first image 1010 is the infrared image captured by the camera system 730. The second image 1020 is the visible light image captured by the camera system 730. The third image 1030 is generated by the processor 410, as explained above. The label information 1040 may be the label information printed on the pharmaceutical pouch captured by the sensor 720, or may be a computer-generated list of data associated with the barcode of the pouch. The images of expected pills 1050 are stock images (e.g., "gold images" from a database) of the medication that a pharmacist should be expecting to see in the pouch based on the information input to pack the pouch.

The patient information 1060 provides information about a patient to whom the pharmaceutical pouch is being dispensed. The patient information 1060 may include, for example, patient name, administration time, facility, and the like. The "Previous Pouches" button 1070 allows a user (for example, a pharmacist) to navigate to screens or columns of previous pouches stored in the system. The "Approve Pouches" button 1080 allows the user to approve the current pouches displayed on the dashboard 1000 and dispense the pouches to the patient. Once the displayed pouches are approved by actuating the button 1080, the dashboard 1000 can automatically navigate to the next screen or columns of pouches. The pouch information 1090 displays information about the pouches being shown on the dashboard 1000. The pouch information 1090 may include, for example, a pouch number, an administration time, a prescription number, and the like.

In some embodiments, the processor 410 may also automatically determine whether the pouches are correctly filled or incorrectly filled. This automatic verification can be used to assist a pharmacist in making his or her determination on whether the pouches were properly filled. In one example technique, the processor 410 determines whether the number of pharmaceuticals or the type of pharmaceuticals (e.g., a first characteristic of pharmaceuticals) included in the pouch matches the number of pharmaceuticals or the type of pharmaceuticals (e.g., a second characteristic of expected pharmaceuticals) of expected pharmaceuticals, based on the label information 1040 or information that is in the prescription order input. The processor 410 may analyze the first image 1010, the second image 1020, the third image 1030, or a combination of the three images to determine the number of pharmaceuticals included in the pouch. For example, the processor 410 may determine the number of pharmaceuticals included in the pouch based on the distinct shadows created in the first image 1010. In other embodiments, other known techniques may be used to determine the number of pharmaceuticals included in the pharmaceutical pouch based on analyzing an image of the pharmaceutical pouch.

The processor 410 may also analyze the third image 1030 of the pharmaceutical pouch to determine the type of pharmaceuticals included in the pharmaceutical pouch. The processor 410 may employ known color analysis techniques on the third image 1030 in addition to the known information from the expected pills 1050 to determine whether the correct type of pharmaceuticals are included in the pharmaceutical pouch. Additionally or alternatively, the processor 410 may use images captured by cameras on the motor base 310 to help identify the pharmaceuticals and to verify that the correct pharmaceuticals were dropped.

Based on these comparisons, the processor 410 provides indications on the dashboard 1000 to identify whether the processor 410 thinks the pouches were correctly or incorrectly filled. For example, the dashboard 1000 may display a first indication on one or more of the images 1010, 1020, 1030, 1040, identifying that the processor 410 thinks the pouch was properly filled. In some embodiments, the dashboard 1000 may display a border 1015 having a first color (e.g., green) around the images 1010, 1020, 1030, 1040 to indicate the pharmaceutical pouch is correctly filled. Similarly, the dashboard 1000 may display a second indication on one or more of the images 1010, 1020, 1030, 1040, identifying that the processor 410 thinks the pouch was not properly filled. In some embodiments, the dashboard 1000 displays a border 1015 having a second color (e.g., red) around the images 1010, 1020, 1030, 1040 to indicate the pharmaceutical pouch might be incorrectly filled. Other indicia (e.g., check marks, X's, etc.) may also be used to show that a pharmaceutical pouch is correctly or incorrectly filled.

Figure 11:
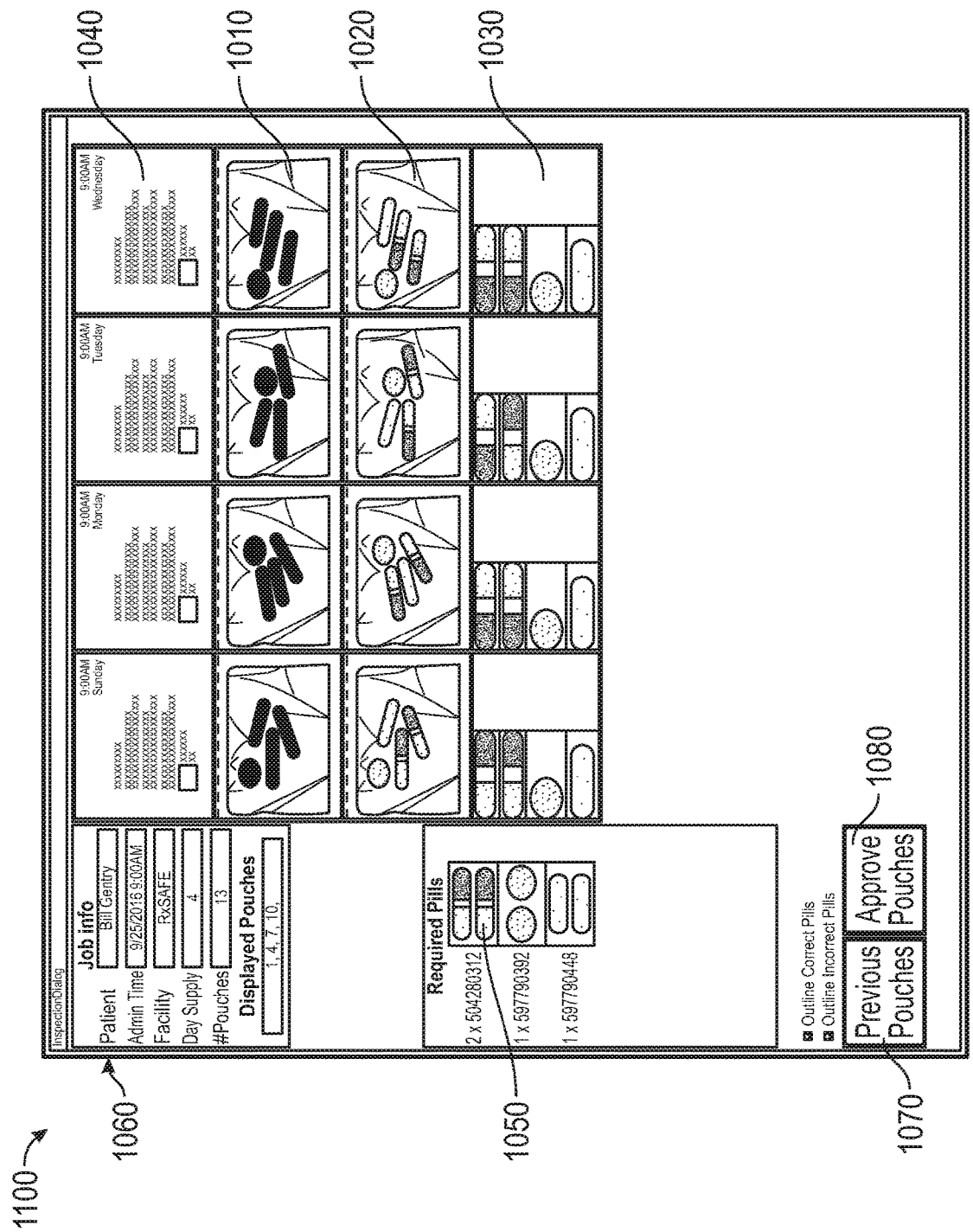
FIG. 11 illustrates another dashboard generated to verify the pharmaceuticals in a pouch.
Figure 12:
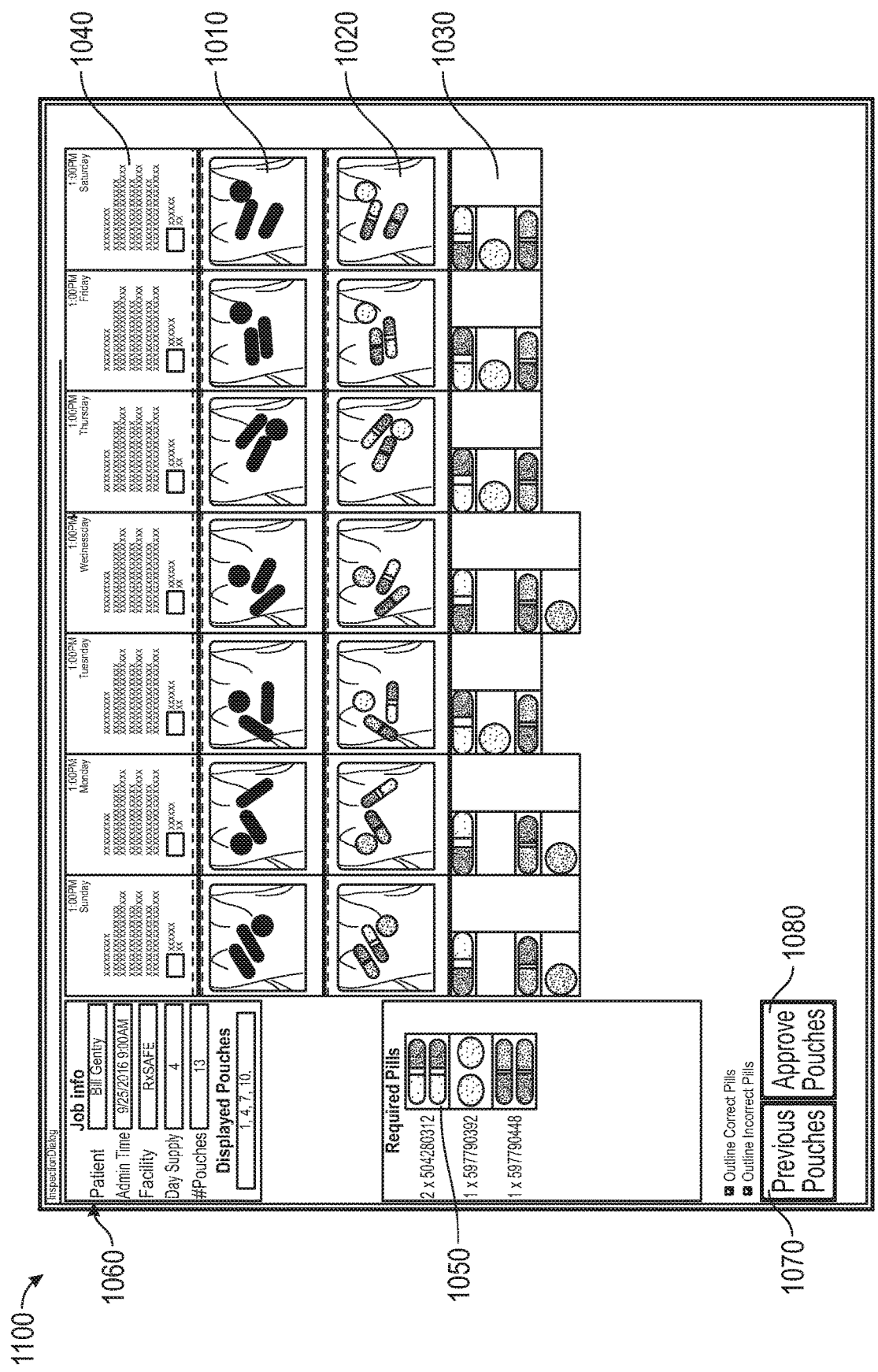
FIG. 12 illustrates yet another dashboard generated to verify the pharmaceuticals in a pouch.

FIGS. 11 and 12 illustrate another dashboard 1100 that may be generated by the processor 410 to aid a pharmacist in verifying that the pouches are correctly filled. The dashboard 1100 is displayed similar to the dashboard 1000 and includes similar components as dashboard 1000. The dashboard 1100 includes a fourth image 1130 that is generated based on the first image 1010 and the second image 1020, similar to the third image 1030. However, in illustrated the fourth image 1130, the pharmaceuticals identified in the pouch are arranged in, for example, rows or columns. In addition, the images of the expected pills 1050 are displayed on a side of the dashboard 1100 such that they are along the same eye level as the fourth image 1130.

In some embodiments, the fourth image 1130 may be generated based on the third image 1030. As described above, the first image 1010 is used to define borders or boundaries of the pharmaceuticals within the pouch. Once the third image 1030 is generated, individual pharmaceuticals may similarly be identified based on the borders or boundary information from first image 1010. The individual pharmaceuticals may then be arranged in rows or columns to generate the fourth image 1130. The fourth image 1130 may be displayed such that the individual pharmaceuticals in the fourth image 1130 align with individual pharmaceuticals in the images of expected pills 1050, as shown.

In addition, the processor 410 may determine whether the individual pharmaceuticals in the fourth image 1130 correspond to the individual pharmaceuticals in the images of expected pharmaceuticals 1050. When the processor 410 determines that an individual pharmaceutical in the fourth image 1130 corresponds with the images of expected pharmaceuticals, the dashboard 1100 may display an indication, for example, a green border around the individual pill to indicate that the pouch includes the expected pharmaceutical (shown in FIG. 12). When the processor 410 determines that an individual pharmaceutical in the fourth image 1130 does not correspond with the images of expected pharmaceutical (i.e., a wrong kind of pharmaceutical is included in the pouch), the dashboard 1100 may display an indication, for example a red border around the individual pill to indicate that the pouch includes a pharmaceutical that should not be included in the pouch (shown in FIG. 12). In addition, the dashboard 1100 may also display an indication, for example a red border around an empty space aligned with an image of an expected pill 1050 when the expected pill is not found in the fourth image 1130 (e.g., when the pill is missing from the pouch) (shown in FIG. 12). In some embodiments, the system may not allow the "Approve Pouches" button 1080 to be actuated until each red-bordered image is individually examined and accepted, rejected, quarantined, or otherwise explained by the pharmacist.

Figure 13:
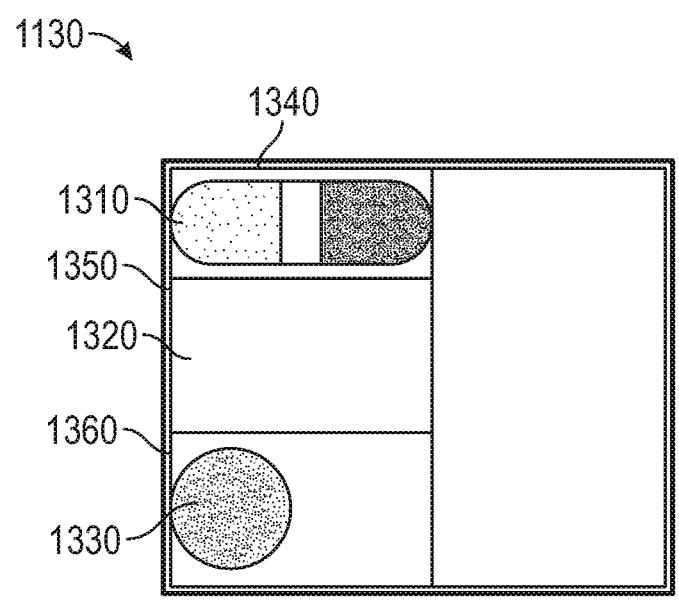
FIG. 13 illustrates an image from the dashboard shown in FIG. 12.

FIG. 13 illustrates an example fourth image 1130 in further detail. In the example illustrated, the fourth image 1130 displays a first pharmaceutical 1310, a blank space 1320 (which indicates where a correct pill should have been displayed), and a second pharmaceutical 1330. The fourth image 1130 also displays indications 1340, 1350, and 1360 in the form of red and green borders around the first pharmaceutical 1310, the blank space 1320, and the second pharmaceutical 1330 respectively. The first pharmaceutical 1310 corresponds to an image of an expected pill 1050 and is shown with the green border 1340. The first pharmaceutical may be displayed along the same level (e.g., horizontally across or vertically above) of the corresponding image of expected pill 1050 (as shown in FIGS. 11 and 12). As such, the pharmacist verifying the pouches may easily conclude that the current pouch includes a correctly filled pharmaceutical. The blank space 1320 is shown with the red border 1350. As described above, a blank space is displayed in the fourth image 1130 to indicate that an expected pill is not found in the pouch being verified. The blank space 1320 may be displayed along the same level (e.g., horizontally across or vertically above) of a corresponding image of an expected pill 1050 that is missing from the pouch (as shown in FIGS. 11 and 12). As such, the pharmacist verifying the pouches may easily conclude that the current pouch is missing a pharmaceutical. The illustrated second pharmaceutical 1330 is also shown with the red border 1360. The second pharmaceutical 1330 may be a pharmaceutical that was incorrectly included in the pouch. The second pharmaceutical 1330 may be displayed at the end of image (e.g., after or below the correctly filled pharmaceuticals and any blank spaces). As such, the pharmacist verifying the pouches may easily conclude that the current pouch includes an improper pharmaceutical.

In some embodiments, the pharmacist may select or click the "Approve Pouches" button 1080 after reviewing all the pouches and each individual suspected pouch to verify that the pouch corresponding to the first column of images is correctly filled. When the pharmacist selects or clicks the "Approve Pouches" button 1080, the dashboard moves the grid of images to the left by one set of images to display the contents of the next pouch. Scrolling through the pouch images in this manner allows each set of images to be aligned next to the "gold images" of the expected pills 1050. As such, the pharmacist may quickly and efficiently verify the contents of the pouch when the fourth image 1130 is next to the images of expected pills 1050.

Figure 14:
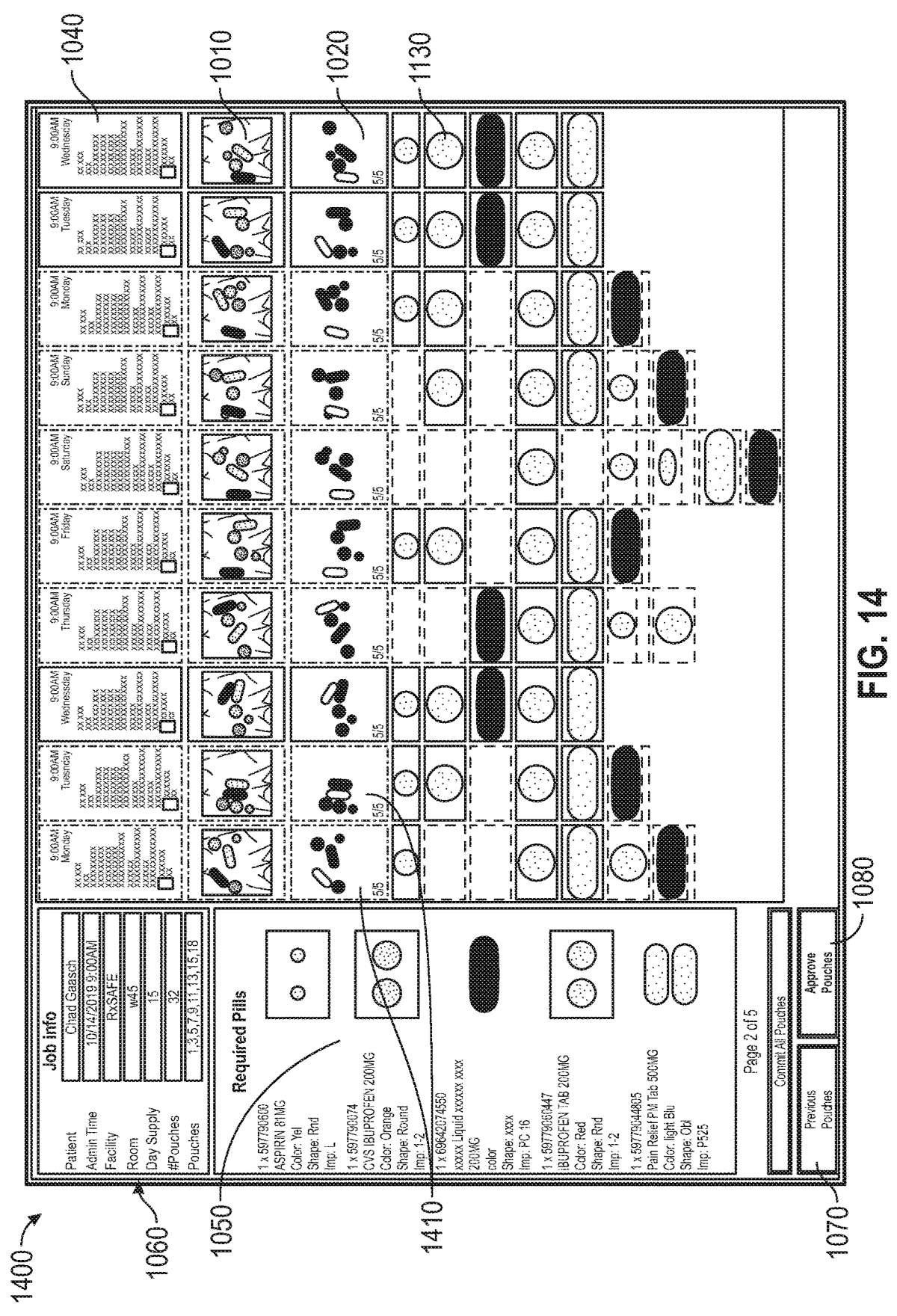
Figure 15:
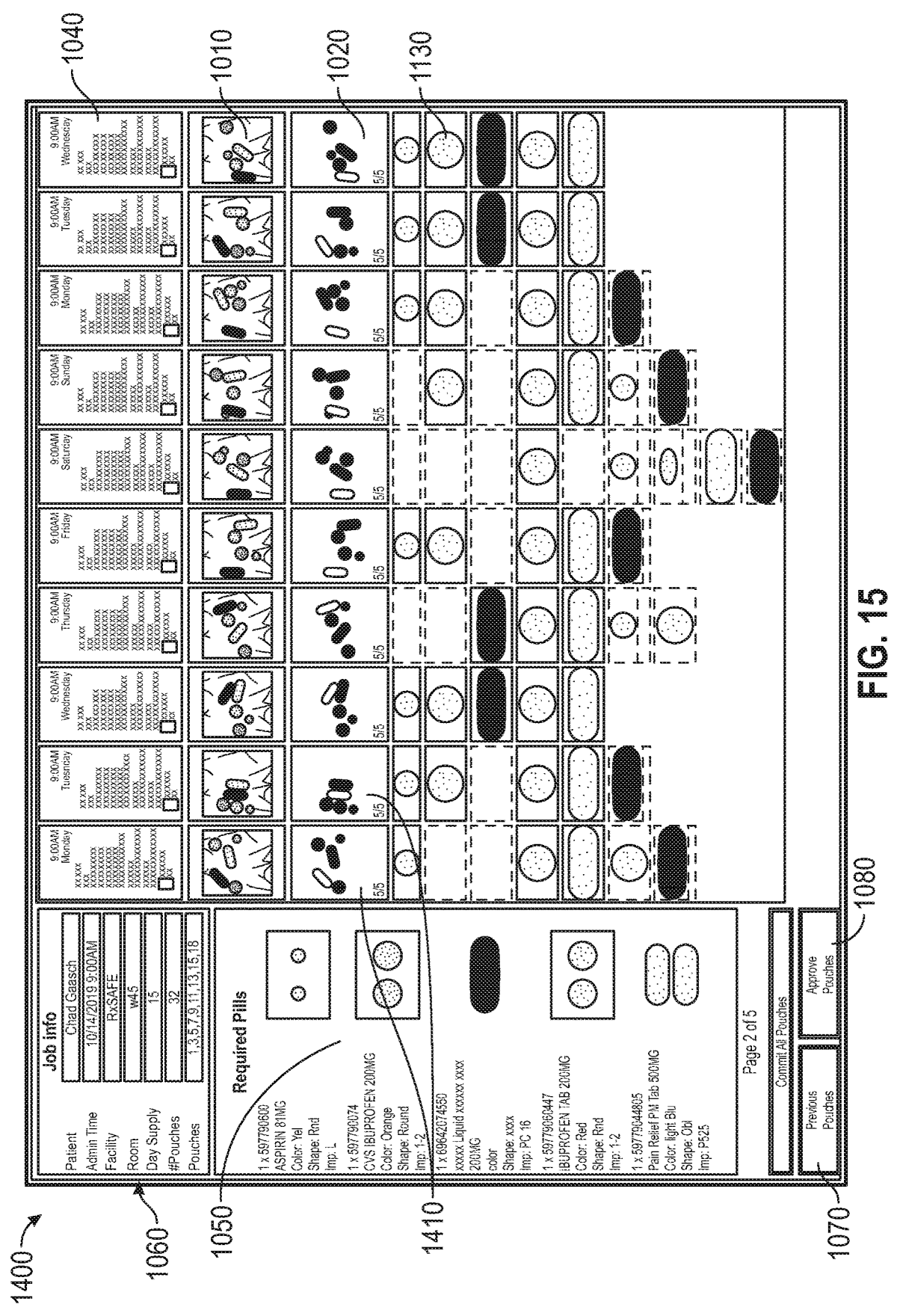
Figure 16:
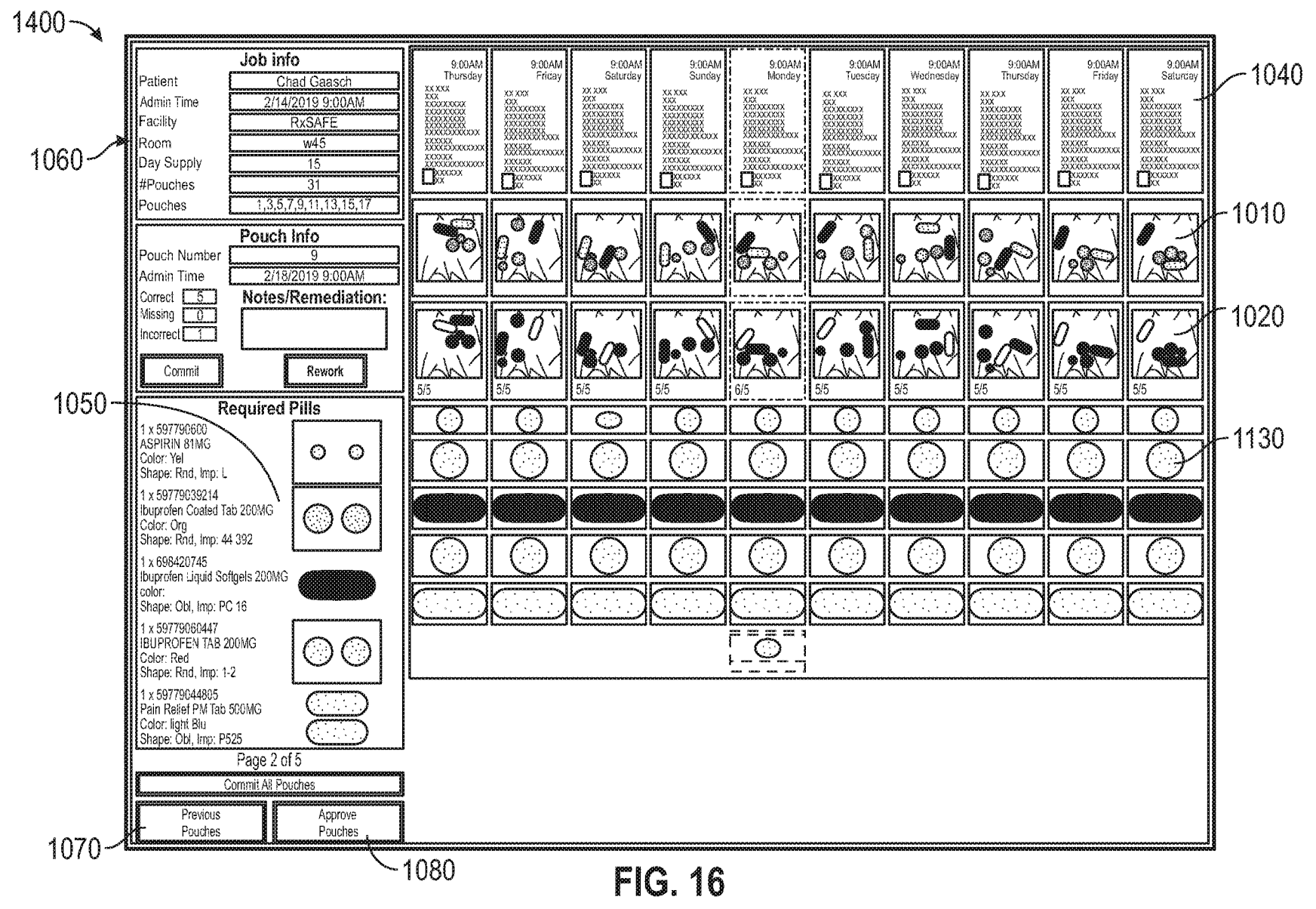

FIGS. 14-16 illustrate another dashboard 1400 that may be generated by the processor 410 to aid a pharmacist in verifying that the pouches are correctly filled. The dashboard 1400 is displayed similar to the dashboard 1100 and includes similar components as dashboard 1100. The dashboard 1400 includes the fourth image 1130 with the pharmaceuticals identified in the pouch arranged in, for example, rows or columns. In addition, the images of the expected pills 1050 are displayed on a side of the dashboard 1400 such that they are along the same eye level as the fourth image 1130.

In addition, the processor 410 may determine whether the individual pharmaceuticals in the fourth image 1130 correspond to the individual pharmaceuticals in the images of expected pharmaceuticals 1050. When the processor 410 determines that an individual pharmaceutical in the fourth image 1130 corresponds with the images of expected pharmaceuticals, the dashboard 1400 may display a first pill indication around the individual pill to indicate that the pouch includes the expected pharmaceutical. When the processor 410 determines that an individual pharmaceutical in the fourth image 1130 does not correspond with the images of expected pharmaceutical (i.e., a wrong kind of pharmaceutical is included in the pouch), the dashboard 1400 may display a second pill indication around the individual pill to indicate that the pouch includes a pharmaceutical that should not be included in the pouch. In addition, the dashboard 1400 may also display a third pill indication around an empty space aligned with an image of an expected pill 1050 when the expected pill is not found in the fourth image 1130 (e.g., when the pill is missing from the pouch). Similarly, when the processor 410 determines that an unidentified pharmaceutical or debris in the pharmaceutical pouch, the unidentified pill or debris in the fourth image 1130 is displayed in a separate box below the images of the identified pharmaceuticals in the fourth image 1130 (as shown in FIG. 16). The dashboard 1400 may display a fourth pill indication around the unidentified pharmaceutical or debris to indicate that the pouch includes a pharmaceutical or object that should not be included in the pouch. The first, second, third, and fourth pill indications may be, for example, different borders. In some embodiments, such as illustrated in FIG. 14, the borders may have different colors, thicknesses or weights, and/or patterns to differentiate between the indications. For example, the border associated with the first pill indication may be green, while the borders associated with the second, third, and fourth pill indications may be red.

FIGS. 14 and 16 illustrate a dashboard before approval by a pharmacist. With reference to FIGS. 14 and 16, when the processor 410 determines that a pouch is correctly packaged, the dashboard 1440 may display a first image indication around each of the first image 1010, the second image 1020, and the label image 1030. When the processor 410 determines that a pouch is incorrectly packaged, the dashboard 1440 may display a second image indication around each of the first image 1010, the second image 1020, and the label image 1030. Similar to the pill indications, the first and second image indications may be, for example, different borders. In some embodiments, such as illustrated in FIGS. 14 and 16, the borders may have different colors, thicknesses or weights, and/or patterns to differentiate between the indications. For example, the border associated with the first image indication may be green, while the border associated with the second image indication may be yellow. In some embodiments, the processor 410 may enlarge an image to aid in the verification. For example, when a user selects an image or hovers the curser over an image, the image is enlarged to twice the size to aid in verification of the image.

In addition, the dashboard 1400 may also display a number of pills indication 1410 providing the number of pills detected in a pouch against a number of pills expected in the pouch. The number of pills indication 1410 may be provided on one of the first mage 1010, the second image 1020, and/or the label image 1040. In one embodiment, the number of pills indication 1410 is provided on the second image 1020 (i.e., the infrared image). In other embodiments, the numbers of pills indication 1410 may be provided in a row or column separate from the images 1010, 1020, 1040. Additionally or alternatively, the number of pills indication 1410 may only display the number of pills detected (and not the number of pills expected).

In some embodiments, the processor 410 may also provide indication around individual pills within the first image 1010 and the second image 1020. For example, as shown in FIGS. 14-16, the processor 410 provides a first indication (e.g., a green border) around a first pill in the second image 1020 when the processor determines that the first pill is expected to be packaged in the corresponding pouch. The processor 410 provides a second indication (e.g., a red border) around a second pill or object in the second image 1020 when the processor 410 determines that the second pill or object is not expected to be packaged in the corresponding pouch or when the second pill or object cannot be identified by the processor 410.

After inspection of the dashboard, the pharmacist may determine whether the errors are correctly identified on the dashboard 1400. When the errors are correctly identified, the pharmacist may click on or select one of the first image 1010, the second image 1020, and the label image 1040 of the corresponding pouch to mark the pouch for further work or further inspection. The processor 410 may print an indication on the pouch such that a packaging technician or pharmacist can identify the incorrectly packaged pouches or pouches that need further work. When the errors are incorrectly identified, the pharmacist may ignore the indications for the misidentified pills in the corresponding pouch. In some embodiments, as described with respect to FIG. 17 below, the pharmacist may add the image of the misidentified pill to the database of "gold images" or expected images. Once the pharmacist is satisfied that all the pouches are correctly packaged and after the pharmacist has identified pouches that need further work, the pharmacist may click on or select the "approve pouches" button 1080. In some embodiments, the pharmacist may use the number of pills indication to identify whether the pouch is correctly packaged. Particularly, when the number of pills indication shows that the correct number of pills, the pharmacist may approve the pouches regardless of whether the processor 410 has determined that the pouch is incorrectly packaged. In some embodiments, the processor 410 may not allow a user to approve pouches unless pouches that do not have the correct number of pills have been selected for further inspection.

FIG. 15 illustrates the dashboard 1400 after approval by the pharmacist. The processor 410 converts the previous indication that a pouch is incorrectly packaged (e.g., a yellow border) to the indication that the pouch is correctly packaged (e.g., a green border) when a pharmacist approves the pouch without selecting it for further inspection. However, the processor 410 does not remove or correct the previous indications around the individual pills. Additionally, the processor 410 does not place the individual pills beside "gold images."

Figure 17:
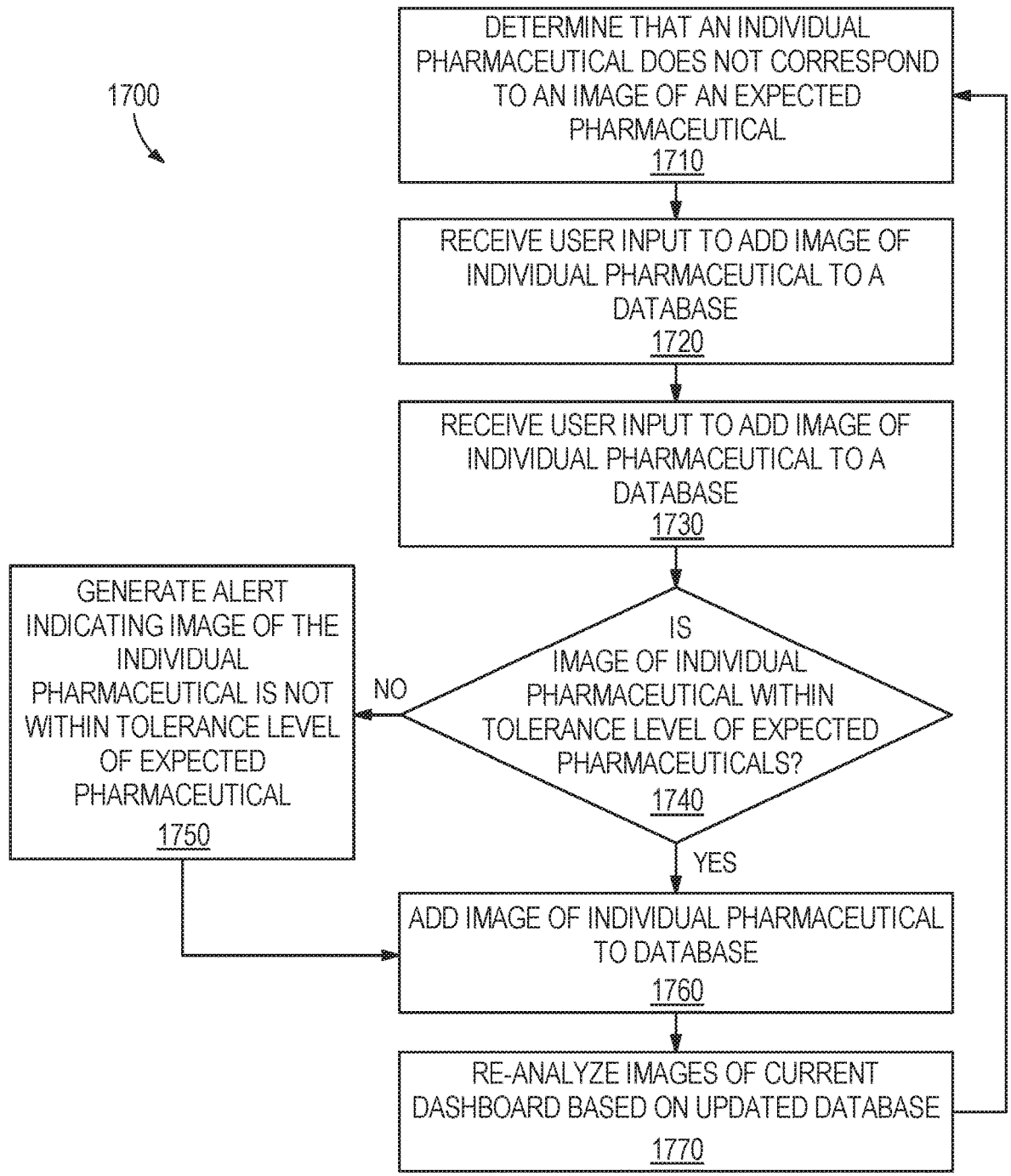
FIG. 17 is a flowchart depicting a method for a learning mode of the verification system of FIG. 7.

FIG. 17 illustrates an example method 1700 for a training mode of the verification system 610. The method 1700 includes determining, using the processor 410, that an individual pharmaceutical in the pouch does not correspond to an image of an expected pharmaceutical (at block 1730). The verification system 610 includes a database storing images of expected pharmaceutical (e.g., images of expected pharmaceuticals 1050) for several pharmaceuticals that are packaged by the automatic packaging unit 120. The database may be populated using, for example, images of the expected pharmaceuticals from the National Drug Code (NDC) database. The fourth image 1130 of the individual pharmaceutical in the pouch is compared to the image of the expected pharmaceutical in the database using image processing techniques to determine whether the individual pharmaceutical in the fourth image 1130 corresponds to the image of an expected pharmaceutical. When there is a match between the image of the individual pharmaceutical and the image of the expected pharmaceutical (for example, a first characteristic of the individual pharmaceutical matches a second characteristic of the expected pharmaceutical), the processor 410 determines that the individual pharmaceutical corresponds to the image of the expected pharmaceutical and determines that the pouch is correctly packaged with respect to the individual pharmaceutical. When the image of the individual pharmaceutical does not match the image of the expected pharmaceutical, the processor 410 determines that the individual pharmaceutical does not correspond to the image of the expected pharmaceutical and determines that the pouch is incorrectly packaged with respect to the individual pharmaceutical. In the example of FIG. 14, the processor 410 identified the first pill of the first column as corresponding to the image of a first expected pharmaceutical. However, the processor 410 identified the second pill of the first column as not corresponding to the image of a second expected pharmaceutical. The processor 410 therefore displays the image of the second pill at the end of the column after all correctly identified pills.

The method 1700 includes receiving, at the user interface 440, a user input to add the image of the individual pharmaceutical to a correct location (at block 1720). With reference to FIG. 14, the pharmacist may determine that the second pill was misidentified by the processor 410 as not corresponding to the expected pharmaceutical. For example, the pill may have been standing on an edge or end, and the database may not have included an image with a similar view of the pill. In this case, the pharmacist may select the second pill and select an option to add the pill to the correct location. For example, the pharmacist may first select the expected image that matches the misidentified pill, then selects (for example, by a right-click or option-click) the misidentified pill. In response to such an action, the processor 410 may remove the image of the misidentified pill from the bottom of the first column and place the image in the location corresponding to the expected image (for example, the blank box lined with the expected image). The processor 410 provides a fifth indication (for example, a colored border) around the image of the individual pharmaceutical in the correct box.

The method 1700 includes receiving, at the user interface 440, a user input to add the image of the individual pharmaceutical to the database storing images of expected pharmaceuticals (at block 1730). By approving the image, the image of the pill may also be added to the database storing images of expected pharmaceuticals. When the second pill is selected, the processor generates a graphical user interface providing an option for the pharmacist to select adding the image of the pill to the database storing images of expected pharmaceuticals. For example, a "Train" option 1420 is provided on the user interface 1400 for selection by the pharmacist. The pharmacist may select the "Train" option to add the image of the individual pharmaceutical to the database storing images of expected pharmaceuticals. In some embodiments, the pharmacist may also specify the orientation of the pill. For example, the pharmacist may specify whether the image of the pill is captured in a first orientation with the camera facing the length, width, or diameter of the pill or in a second orientation with the camera facing the height of the pill.

The method 1700 includes determining, using the processor 410, whether the image of individual pharmaceutical is within a tolerance level of the expected pharmaceutical (at block 1740). When the images of expected pharmaceuticals are loaded into the database, the processor 410 extracts characteristics of the images to determine the features of the expected pharmaceuticals. For example, the processor 410 uses pixel data to determine the length, width, height, diameter, color, shape, and the like of the expected pharmaceutical based on the images of the expected pharmaceuticals. The database may store more than one image of an expected pharmaceutical. The processor 410, based on the features extracted from the one or more images of the expected pharmaceutical, determines the tolerance level for one or more features of the expected pharmaceutical. For example, based on the one or more images of the expected pharmaceutical, the processor 410 may determine that the length of the expected pharmaceutical is 2 centimeters (cm)+/−10% tolerance. That is, a packaged pharmaceutical will be accepted as the expected pharmaceutical when, based on the image captured of the packaged pharmaceutical, the processor 410 determines that the length of the package is between 1.8 to 2.2 cm. When the image of individual pharmaceutical from the dashboard 1400 is being trained to the database, the processor 410 compares the features of the individual pharmaceutical based on the image of the individual pharmaceutical to the tolerance levels of the expected pharmaceutical determined based on the images of the expected pharmaceuticals or based on information received from the NDC database. The processor 410 may determine the orientation of the image of the individual pharmaceutical to determine which features (for example, length, width, or diameter vs. height) to compare to the tolerance levels.

Figure 18:
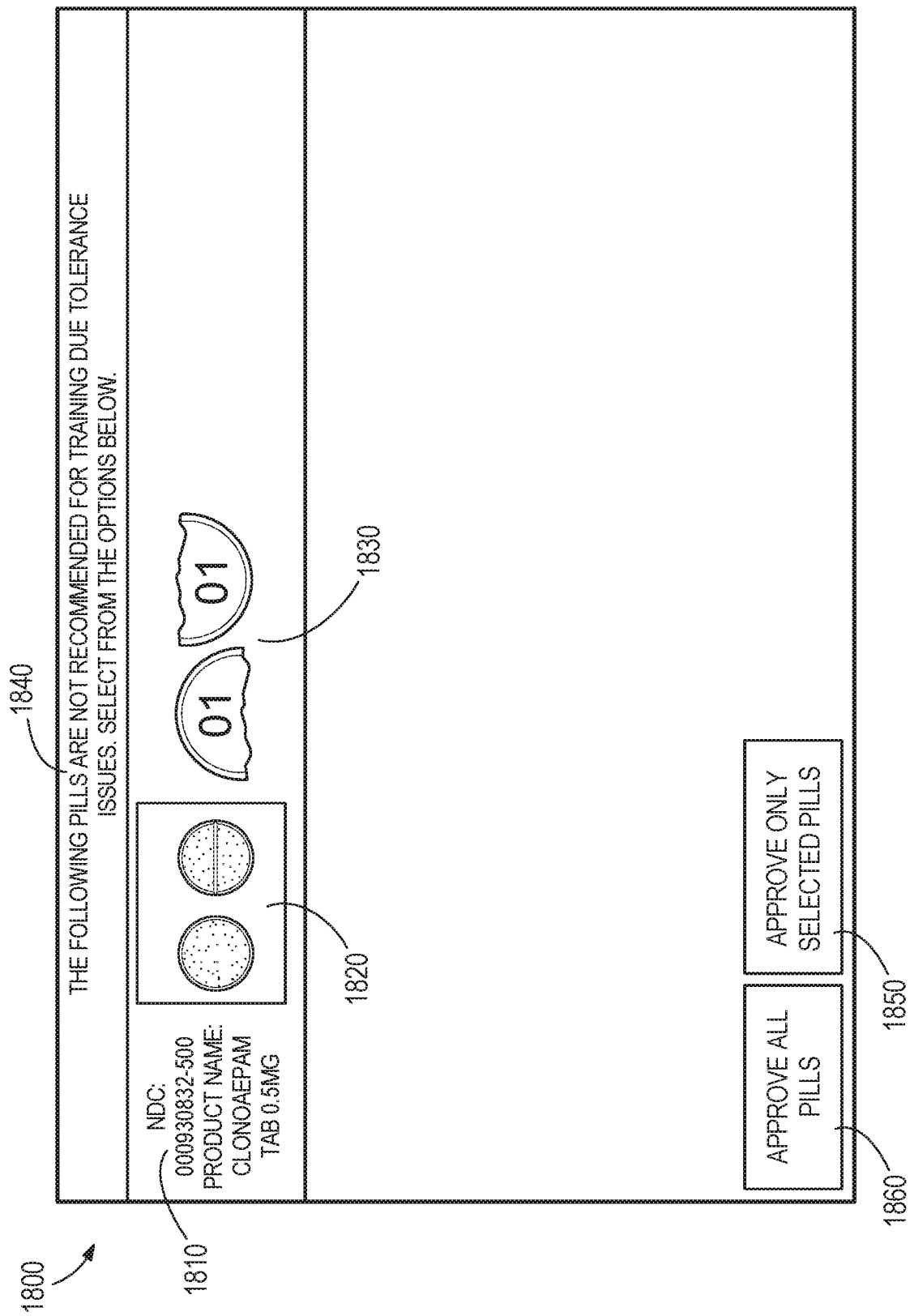
FIG. 18 illustrates a graphical user interface alert generated during the learning mode of FIG. 17.

When the image of individual pharmaceutical is not within a tolerance level of the images of expected pharmaceutical, the method 1700 includes generating, at the user interface, an alert indicating that the image of the individual pharmaceutical is not within the tolerance level of the expected pharmaceutical (at block 1750). The processor 410 may generate the alert as a second graphical user interface 1800 as shown in FIG. 18. The second graphical user interface 1800 includes information of the expected pharmaceutical 1810, an example image of an expected pharmaceutical 1820, the image of the individual pharmaceuticals 1830 that were selected to be added to the database, and an alert message 1840 informing the user that the image of the individual pharmaceutical is not within the tolerance level of the images of expected pharmaceutical. The second graphical user interface 1800 may show the above information for all the pharmaceuticals from the current dashboard 1400 that are being trained to the database. On the second graphical user interface 1800, the pharmacist may select the desired images to approved and reject the remaining images. The pharmacist may approve only selected images by selecting the "Approve Only Selected Pills" option 1850. The pharmacist may approve all images by selecting the "Approve All" option 1860. The rejected pills will not be added to the database.

When the image of individual pharmaceutical is within the tolerance level of the images of expected pharmaceutical and/or when the pharmacist approves the image of the individual pharmaceutical to be added to the database, the method 1700 includes adding, using the processor 410, the image of the individual pharmaceutical to the database storing images of expected pharmaceuticals (at block 1760). The processor 410 adds the selected image of the individual pharmaceutical (for example, the second pill of first column in FIG. 14) and adds the image of the pill to the comparison images of the corresponding pharmaceutical. The selected image can then be used for comparison of the packaged pharmaceuticals with the expected pharmaceuticals. The processor 410 may also recalculate the tolerance levels based on the new images of expected pharmaceuticals added to the database.

The method 1700 also includes re-analyzing, using the processor 410, the images of the current dashboard 1400 based on the updated database (at block 1770). The processor 410 re-analyzes the images of the current dashboard, that is, the pouches illustrated on the screen when the database is updated in response to user input. The processor 410 regenerates the dashboard based on the analyzing the images of the current dashboard using the updated database and displays the regenerated dashboard. In some embodiments, the processor 410 may only re-analyze the images of the current dashboard that were previously identified as incorrectly packaged. In other embodiments, the processor 410 may re-analyze all the images of the current dashboard. The processor 410 may also analyze any future dashboards using the updated database. The method 1700 may be repeated for the next misidentified pharmaceutical in the dashboard.

Various features and advantages of the invention are set forth in the following claims.

What is claimed is:

1. A pharmacy packaging system comprising:
a feed roll for forming a pharmaceutical pouch;
a dispenser configured to dispense pharmaceuticals into the pharmaceutical pouch formed by the feed roll; and
a verification system including
a camera system configured to capture images in a visible spectrum and an infrared spectrum,
a first light source configured to output infrared spectrum light,
a second light source configured to output visible spectrum light, and
a processor communicatively coupled to the camera system, the first light source, and the second light source, the processor operable to:
activate the first light source to illuminate the pharmaceutical pouch,
capture a first image, using the camera system, of the pharmaceutical pouch while illuminated by the first light source,
activate the second light source to illuminate the pharmaceutical pouch,
capture a second image, using the camera system, of the pharmaceutical pouch while illuminated by the second light source,
generate a third image based on the first image and the second image,
generate a unitary dashboard to simultaneously display first images, second images, and third images from a plurality of pharmaceutical pouches, wherein the first images, the second images, and the third images are arrayed in a grid on the unitary dashboard, and
display a number of pills detected in the pouch against a number of pills expected in the pouch within one or more of the first images and the second images.

2. The pharmacy packaging system of claim 1, wherein the processor is further operable to:
analyze the third image to determine a first characteristic of pharmaceuticals in the pharmaceutical pouch,
determine whether the first characteristic of pharmaceuticals in the pharmaceutical pouch matches a second characteristic of expected pharmaceuticals,
when the first characteristic of pharmaceuticals in the pharmaceutical pouch matches the second characteristic of expected pharmaceuticals, provide a first indication on the third image that the pharmaceutical pouch is correctly filled, and
when the first characteristic of pharmaceuticals in the pharmaceutical pouch does not match the second characteristic of expected pharmaceuticals, provide a second indication on the third image that the pharmaceutical pouch is incorrectly filled,
wherein the first indication and the second indication are provided in addition to the display of the number of pills detected in the pouch against a number of pills expected in the pouch.

3. The pharmacy packaging system of claim 2, wherein the first indication includes a border around the third image having a first color, and wherein the second indication includes a border around the third image having a second color that is different than the first color.

4. The pharmacy packaging system of claim 2, wherein the first indication includes a border having a first color around an individual pharmaceutical in the third image, and wherein the second indication includes a border having a second color that is different than the first color around one of a blank space or an individual pharmaceutical in the third image.

5. The pharmacy packaging system of claim 2, wherein the processor is further configured to:
determine that an individual pharmaceutical in the pharmaceutical pouch does not correspond to an image of an expected pharmaceutical based on the third image;
receive, at a user interface, a user input to add the image of the individual pharmaceutical from the third image to a database storing images of expected pharmaceuticals;
add the image of the individual pharmaceutical to the database in response to receiving the user input; and
re-analyze the third images of the unitary dashboard based on the updated database.

6. The pharmacy packaging system of claim 2, wherein the processor is further operable to:
when the first characteristic of pharmaceuticals in the pharmaceutical pouch matches the second characteristic of expected pharmaceuticals, provide the first indication on one or more of the first image and the second image indicating that the pharmaceutical pouch is correctly filled; and
when the first characteristic of pharmaceuticals in the pharmaceutical pouch does not match the second characteristic of expected pharmaceuticals, provide the second indication on one or more of the first image and the second image indicating that the pharmaceutical pouch is incorrectly filled.

7. The pharmacy packaging system of claim 6, wherein the first indication includes a border around one or more of the first image and the second image having a first color, and wherein the second indication includes a border around one or more of the first image and the second image having a second color that is different than the first color.

8. The pharmacy packaging system of claim 1, wherein the unitary dashboard further includes images of expected pills, wherein the third image includes individual pharmaceuticals arranged in rows or columns, and wherein the third image is displayed such that the individual pharmaceuticals in the third image align with individual pharmaceuticals in the images of expected pills.

9. The pharmacy packaging system of claim 8, wherein the third image includes a blank space that indicates where a correct pill should have been displayed, and wherein the third image includes a border around the blank space having a color to indicate that the expected pill is missing from the pharmaceutical pouch.

10. The pharmacy packaging system of claim 5, wherein receiving the user input includes receiving a selection of the individual pharmaceutical from the third image.

11. A method of verifying pharmaceuticals packaged within a pharmaceutical pouch using a pharmacy packaging system, the pharmacy packaging system including a feed roll for forming the pharmaceutical pouch, a dispenser configured to dispense pharmaceuticals into the pharmaceutical pouch formed by the feed roll, a camera system configured to capture images in a visible spectrum and an infrared spectrum, a first light source configured to output an infrared spectrum light, a second light source configured to output a visible spectrum light, and a processor communicatively coupled to the camera system, the first light source, and the second light source, the method comprising:
activating, by the processor, the first light source to illuminate the pharmaceutical pouch;
capturing a first image, by the processor using the camera system, of the pharmaceutical pouch while illuminated by the first light source;
activating, by the processor, the second light source to illuminate the pharmaceutical pouch;
capturing a second image, by the processor using the camera system, of the pharmaceutical pouch while illuminated by the second light source;
generating, by the processor, a third image based on the first image and the second image;
generating, by the processor, a unitary dashboard to simultaneously display first images, second images, and third images from a plurality of pharmaceutical pouches, wherein the first images, the second images, and the third images are arrayed in a grid on the unitary dashboard;
displaying a number of pills detected in the pouch against a number of pills expected in the pouch within one or more of the first images and the second images; and
displaying the unitary dashboard.

12. The method of claim 11, further comprising:
analyzing the third image to determine a first characteristic of pharmaceuticals in the pharmaceutical pouch,
determining whether the first characteristic of pharmaceuticals in the pharmaceutical pouch matches a second characteristic of expected pharmaceuticals,
when the first characteristic of pharmaceuticals in the pharmaceutical pouch matches the second characteristic of expected pharmaceuticals, providing a first indication on the third image that the pharmaceutical pouch is correctly filled, and when the first characteristic of pharmaceuticals in the pharmaceutical pouch does not match the second characteristic of expected pharmaceuticals, providing a second indication on the third image that the pharmaceutical pouch is incorrectly filled, wherein the first indication and the second indication are provided in addition to the display of the number of pills detected in the pouch against a number of pills expected in the pouch.

13. The method of claim 12, wherein the first indication includes a border around the third image having a first color, and wherein the second indication includes a border around the third image having a second color that is different than the first color.

14. The method of claim 12, wherein the first indication includes a border having a first color around an individual pharmaceutical in the third image, and wherein the second indication includes a border having a second color that is different than the first color around one of a blank space or an individual pharmaceutical in the third image.

15. The method of claim 12, further comprising:
determining, using the processor, that an individual pharmaceutical in the pharmaceutical pouch does not correspond to an image of an expected pharmaceutical based on the third image;
receiving, at a user interface, a user input to add the image of the individual pharmaceutical from the third image to a database storing images of expected pharmaceuticals;
adding, using the processor, the image of the individual pharmaceutical to the database in response to receiving the user input; and
re-analyzing, using the processor, the images of the unitary dashboard based on the updated database.

16. The method of claim 12, further comprising:
when the first characteristic of pharmaceuticals in the pharmaceutical pouch matches the second characteristic of expected pharmaceuticals, providing the first indication on one or more of the first image and the second image indicating that the pharmaceutical pouch is correctly filled; and
when the first characteristic of pharmaceuticals in the pharmaceutical pouch does not match the second characteristic of expected pharmaceuticals, providing the second indication on one or more of the first image and the second image indicating that the pharmaceutical pouch is incorrectly filled.

17. The method of claim 16, wherein the first indication includes a border around one or more of the first image and the second image having a first color, and wherein the second indication includes a border around one or more of the first image and the second image having a second color that is different than the first color.

18. The method of claim 11, wherein the unitary dashboard further includes images of expected pills, wherein the third image includes individual pharmaceuticals arranged in rows or columns, and wherein the third image is displayed such that the individual pharmaceuticals in the third image align with individual pharmaceuticals in the images of expected pills.

19. The method of claim 18, wherein the third image includes a blank space that indicates where a correct pill should have been displayed, and wherein the third image includes a border around the blank space having a color to indicate that the expected pill is missing from the pharmaceutical pouch.

20. The method of claim 15, wherein receiving the user input includes receiving a selection of the individual pharmaceutical from the third image.

* * * * *